(12) United States Patent
Kamiya et al.

(10) Patent No.: US 10,494,133 B2
(45) Date of Patent: Dec. 3, 2019

(54) WHITE GLASS CONTAINER AND METHOD FOR PRODUCING SAME

(71) Applicant: KOA GLASS CO., LTD., Tokyo (JP)

(72) Inventors: Yoshiaki Kamiya, Tokyo (JP); Naoki Nakamura, Tokyo (JP)

(73) Assignee: KOA GLASS CO., LTD., Tokyo (JP)

( * ) Notice: Subject to any disclaimer, the term of this patent is extended or adjusted under 35 U.S.C. 154(b) by 252 days.

(21) Appl. No.: 15/318,941

(22) PCT Filed: Aug. 4, 2015

(86) PCT No.: PCT/JP2015/072013
§ 371 (c)(1),
(2) Date: Dec. 14, 2016

(87) PCT Pub. No.: WO2016/021569
PCT Pub. Date: Feb. 11, 2016

(65) Prior Publication Data
US 2017/0137162 A1 May 18, 2017

(30) Foreign Application Priority Data
Aug. 5, 2014 (JP) ................................. 2014-159317

(51) Int. Cl.
*B65D 1/02* (2006.01)
*B65D 1/40* (2006.01)
(Continued)

(52) U.S. Cl.
CPC ........... *B65D 1/0215* (2013.01); *B65D 1/023* (2013.01); *B65D 1/40* (2013.01); *C03B 9/3833* (2013.01);
(Continued)

(58) Field of Classification Search
CPC ... C03C 4/02; C03C 3/097; C03C 2201/3476; C03C 2204/04; C03C 3/093; C03C 4/20; B65D 1/40
(Continued)

(56) References Cited

U.S. PATENT DOCUMENTS 9,458,046 B1   10/2016   Kamiya et al.
2016/0264448 A1   9/2016   Kamiya et al.

FOREIGN PATENT DOCUMENTS

GB   1 454 335 A   11/1976
JP   S50-150715 A   12/1975
(Continued)

OTHER PUBLICATIONS

Extended European Search Report dated Mar. 24, 2017, in corresponding EP Application No. 15829884.4.
(Continued)

Primary Examiner — Lee E Sanderson
Assistant Examiner — Michael C Romanowski
(74) Attorney, Agent, or Firm — Fitch, Even, Tabin & Flannery, L.L.P.

(57) ABSTRACT

A white glass container derived from a phase separation phenomenon of a halogen-free glass composition includes a neck portion and a body portion. The glass composition includes as ingredients at least $SiO_2$, $P_2O_5$, $Al_2O_3$, $B_2O_3$, $R_2O$ (R=Na or K), MgO, CaO and the like. The neck portion and the body portion respectively have a white multilayer structure formed to successively include a white transparent layer of relatively low white coloration and a white opaque layer of relatively high white coloration from the outer surface side. The contents of $P_2O_5$ in the white transparent layer are made smaller than the contents of $P_2O_5$ in the white opaque layer.

6 Claims, 8 Drawing Sheets

(51) Int. Cl.
  *C03B 11/12* (2006.01)
  *C03B 9/38* (2006.01)
  *C03C 3/097* (2006.01)
  *C03C 4/02* (2006.01)

(52) U.S. Cl.
  CPC .......... *C03B 9/3875* (2013.01); *C03B 11/125* (2013.01); *C03C 3/097* (2013.01); *C03C 4/02* (2013.01); *C03C 2204/04* (2013.01)

(58) Field of Classification Search
  USPC .......................................................... 501/32
  See application file for complete search history.

(56) References Cited

FOREIGN PATENT DOCUMENTS

| | | |
|---|---|---|
| JP | S62-052140 A | 3/1987 |
| JP | 08277142 A | 10/1996 |
| WO | 2009133761 A1 | 11/2009 |
| WO | 2014188614 A1 | 11/2014 |

OTHER PUBLICATIONS

International Search Report for PCT/JP2015/072013 dated Nov. 10, 2015; English translation submitted herewith (5 pages).

WHITE GLASS CONTAINER AND METHOD FOR PRODUCING SAME

CROSS-REFERENCE TO RELATED APPLICATIONS

This application is a U.S. national phase application filed under 35 U.S.C. § 371 of International Application No. PCT/JP2015/072013, filed Aug. 4, 2015, designating the United States, and claims priority from Japanese Patent Application No. 2014-159317, filed Aug. 5, 2014, and the complete disclosures of which applications are hereby incorporated herein by reference in their entirety for all purposes.

TECHNICAL FIELD

The present invention relates to a white glass container and a method for producing a white glass container. More particularly, the invention relates to a white glass container which is stably provided at least in the body portion with a white multilayer structure derived from a phase separation phenomenon of a composition for halogen-free glass, in a case in which the container is produced using an automatic bottle making machine, and to a method for producing such a white glass container.

BACKGROUND ART

A glass that has been whitened by incorporating particles having different refractive indices and the like into transparent glass so as to cause light scattering therein, or by uniformly dispersing a certain amount of opaque fine particles from the beginning, and thereby reducing light transmittance, is generally called milky white glass, opaline glass, or white glass. Due to its satisfactory aesthetic appearance and storage stability, whitened glass is used in containers, tableware, construction materials and the like.

Here, conventional white glass compositions usually contain predetermined amounts of fluorine, and milky whitening is achieved by uniformly dispersing a crystalline phase of NaF as a milky white component in a glass phase of $SiO_2$ as a main component (see, for example, Patent Document 1).

More specifically, disclosed is a white glass composition including 70% to 73% by weight of $SiO_2$ and 4% to 6% by weight of fluorine, and white glass containers are formed using that composition.

On the other hand, a method for producing crystallized glass formed from a glass composition that does not include fluorine has been proposed (see, for example, Patent Document 2).

More specifically, disclosed is a method for producing an opaque (white) crystallized glass containing phosphorus, the method being characterized in that glass is molded using a glass composition which includes a predetermined glass composition including 45% to 65% of $SiO_2$, 3% to 15% of $Al_2O_3$, 10% to 25% of $Na_2O$, 12% to 25% of CaO, and 3% to 8% of $P_2O_5$, all on the basis of percentage by weight, at a proportion of 90% by weight or more of the total amount, and the molded glass is gradually cooled, subsequently subjected to a post-heat treatment at about 900° C., and crystallized.

Furthermore, the applicant of the present invention has proposed a milky white glass composition that does not contain a significant amount of fluorine, can be produced safely and easily, exhibits superior white coloration, and can be melted at low temperature (see, for example, Patent Document 3).

More specifically, disclosed is a milky white glass composition including 35% to 65% by weight of $SiO_2$, 3.5% to 10% by weight of $P_2O_5$, 5.5% to 15% by weight of $Al_2O_3$, and 3% to 15% by weight of CaO, which gives milky white glass only by melting a predetermined glass raw material at about 1400° C. and then slowly cooling the material.

CITATION LIST

Patent Document

Patent Document 1: JP 62-52140 A (claims and the like)
Patent Document 2: JP 50-150715 A (claims and the like)
Patent Document 3: JP 8-277142 A (claims and the like)

DISCLOSURE OF THE INVENTION

Problem to be Solved by the Invention

However, on the occasion of producing the white glass composition disclosed in Patent Document 1, since fluorite ($CaF_2$), sodium silicofluoride ($Na_2SiF_6$), cryolite ($Na_3AlF_6$) and the like are used as the fluorine raw materials, a significant amount (about 10% to 50%) of fluorine gas disperses at the time of melting glass. Therefore, there has been a problem that the glass causes air pollution, is also harmful to agricultural products and the like, and lacks in safety.

Furthermore, according to the method for producing crystallized glass containing phosphorus as disclosed in Patent Document 2, there has been a problem that when glass is molded and then slowly cooled, cracks are easily generated. There has also been a problem that if the glass composition is not heat-treated at a high temperature of about 900° C. after slow cooling, opaque (white) crystallized glass is not obtained.

Moreover, it is believed to be because, although the disclosed glass composition does not include fluorine, the amount of incorporation of $Na_2O$ or CaO is too large, and $B_2O_3$ or the like is not at all used; however, there has been a problem that white coloration of the resulting crystallized glass is insufficient, and the crystallized glass is likely to become partially transparent.

When the milky white glass composition disclosed in Patent Document 3 is used, milky white glass is obtained after a heating treatment at a temperature higher than or equal to the glass transition temperature, without performing an additional heat treatment. However, due to the variations in the ingredients of the glass raw material or the melting conditions, there was observed an occurrence in which foreign materials suspected to be phosphate crystals having a predetermined particle size or larger precipitated out at the surface of the milky white glass, satisfactory external appearance was not obtained, and also the glass exhibited deteriorated whiteness or mechanical strength.

More specifically, in a case in which white glass containers formed from milky white glass are produced using an automatic bottle making machine, although it is speculated to be attributable to $P_2O_5$ or CaO, which are hard to mix in, or to zinc oxide or alumina, both having relatively high specific gravity, in regard to a milky white glass containing these in the formulation, there have been occurrences in which phosphate crystals having a predetermined particle size or larger appear on the surface of white glass, the white glass is partially colored, or cracks are generated at the time of slow cooling, as a result of fluctuation in the slow cooling conditions after molding.

Thus, the inventors of the present invention conducted a thorough investigation, and as a result, the inventors found that in regard to the production of a white glass container having a white multilayer structure derived from a phase separation phenomenon in a halogen-free white glass composition that does not contain a significant amount of fluorine compounds, even in a case in which predetermined ingredients of the glass raw material or melting conditions seem to have slightly changed, a white glass container having excellent smoothness, in which the average particle size of a white crystals that is smaller than or equal to a predetermined value in at least the body portion, and which has a white multilayer structure having different glass formulations (at least a white transparent layer and a white opaque layer) while suppressing the generation of foreign material at the surface, is obtained. Thus, the inventors completed the present invention.

That is, an object of the present invention is to provide a white glass container which has a white multilayer structure having different glass compositions at least in a body portion, and more preferably in a neck portion and a body portion, and exhibits excellent mechanical strength and white coloration; and an efficient method for producing a white glass container, by which a white glass container such as described above is stably obtained from a glass component in a molten state having a single glass composition.

Means for Solving Problem

According to the present invention, there is provided a white glass container having at least a neck portion and a body portion and derived from a phase separation phenomenon of a glass composition, in which the glass composition includes, as ingredients, at least $SiO_2$, $P_2O_5$, $Al_2O_3$, $B_2O_3$, $R_2O$ (R=Na or K), ZnO and CaO, or at least $SiO_2$, $P_2O_5$, $Al_2O_3$, $B_2O_3$, $R_2O$ (R=Na or K), MgO and CaO; the body portion has, in some parts or in the entirety, a white multilayer structure formed to successively include a white transparent layer of relatively low white coloration and a white opaque layer of relatively high white coloration, from the outer surface side toward the inner surface side; and the content of $P_2O_5$ in the white transparent layer is made smaller than the content of $P_2O_5$ in the white opaque layer. Thus, the problems described above can be solved.

For example, when a white glass container is configured while taking account of the relation between the content of $P_2O_5$ in the white transparent layer and the content of $P_2O_5$ in the white opaque layer as measured using wavelength dispersive fluorescent X-ray spectrometry, even in a case in which the melting conditions or molding conditions for the glass composition have been changed, a white glass container having a stable white multilayer structure derived from a phase separation phenomenon of a composition for glass can be obtained by molding the glass composition using a predetermined mold or the like.

That is, as illustrated in FIG. 4(a), in the white opaque layer, uniformly dispersed white crystals (phosphate crystals) having an average particle size of 400 nm or less can be produced.

Uniformly dispersed white crystals (phosphate crystals) having an average particle size of 400 nm or less are produced in the white transparent layer as well; however, compared to the case of the white opaque layer, it may be said that the number (concentration) of the crystals is very small, and even if the white crystals are tinged with white, the white crystals have predetermined transparency.

On the other hand, in a case in which the melting conditions or molding conditions for the glass composition have slightly changed, phosphate crystals having a large average particle size, for example, an average particle size of 3 μm or more (hereinafter, may be referred to as foreign materials) may be produced in the interior of the white opaque layer as illustrated in FIG. 4(b), or on the surface of the resulting white glass container as illustrated in FIG. 4(c).

Thus, by controlling the relation of the contents of $P_2O_5$ in the white transparent layer and the white opaque layer that constitute the white multilayer structure at least in a body portion, and more preferably in a neck portion and a body portion (hereinafter, the same), the average particle size of the white crystals can be controlled to a value smaller than or equal to a predetermined value, and generation of foreign materials can be suppressed. Also, a white glass container which has excellent mechanical strength or the like while exhibiting rich white coloration even though the glass material is halogen-free, can be obtained.

Meanwhile, the white transparent layer and the white opaque layer having different $P_2O_5$ contents and the like can be produced from molten glass having a single glass composition. For example, in a case in which a glass is produced using an automatic bottle making machine, the contents of $P_2O_5$ in the white transparent layer and the white opaque layer can be controlled by appropriately adjusting the material, type, thermal conductivity or the like of the mold, and also cooling the neck portion and the body portion at a cooling rate that is faster or slower than a conventional cooling rate.

More specifically, it has been found that the relation between the contents of $P_2O_5$ in the white transparent layer and the white opaque layer can be controlled by implementing the following control processes (1) to (8) singly, or selecting multiple processes therefrom and implementing them in combination.

(1) The formulation of the molten glass, particularly the contents or blending proportions of $P_2O_5$ and CaO with respect to the total amount of the formulation, or the blending ratio of $P_2O_5$ and CaO is appropriately adjusted.

(2) The molten glass includes in the formulation at least $SiO_2$, $P_2O_5$, $Al_2O_3$, $B_2O_3$, $R_2O$ (R=Na or K), ZnO, and CaO (hereinafter, may be referred to as formulation A).

(3) The molten glass includes in the formulation at least $SiO_2$, $P_2O_5$, $Al_2O_3$, $B_2O_3$, $R_2O$ (R=Na or K), MgO and CaO (hereinafter, bay referred to as formulation B). That is, the entirety or a portion of ZnO in the first formulation is replaced with MgO that is lighter in weight, and also, the value of the blending ratio (weight ratio) of Ca/MgO is adjusted within the range of 1 to 2.

(4) The material of the mold is selected to be at least one of wrought iron, WC, SiC, CVD-SiC-coated metal, stainless steel, and the like, and heat transfer properties are controlled.

(5) Regarding the type of the mold, a mold for a one-press method or a blow molding mold (including a blow/blow molding mold and a press/blow molding mold), in which multiple air-trapping sites are provided inside the mold to increase a thermal insulation effect, is used.

(6) Mold cooling air at a temperature of 20° C. to 60° C. is used, wet air (water vapor content: 15 to 130 $g/m^3$) is used, the jet velocity of the mold cooling air is adjusted to a value within the range of 1 to 50 liters/second, or multiple mold cooling air streams (first cooling air (wet air) that cools the glass container itself including the inner surface of the glass container, and second cool air (non-wet air) that cools the outer surface (outermost surface) of the mold) is used.

(7) The mold is partially heated or entirely heated using a gas burner or the like, and thereby heat transfer properties are controlled.

(8) A reheating treatment or a slow cooling process is implemented while considering the time taken for whitening of the glass composition that constitutes a glass container.

In addition to that, in regard to whiteness of the white glass container (body portion and the like), the degree of whiteness (L) measured according to JIS Z 8730 can be taken as a reference, and for example, when such a degree of whiteness (L) is 70 or more, it can be said that whiteness is relatively superior. On the contrary, when such a degree of whiteness (L) is below 70, it can be said that whiteness is relatively low.

Furthermore, in a case in which the total amount of the formulation of the glass raw material is above 100% by weight, the amounts of incorporation of various glass components are calculated relatively so as to obtain various blending proportions defined based on a total amount of 100% by weight. In a case in which the total amount of the glass raw material is below 100% by weight, the raw material will be supplemented with other glass components (hereinafter, the same).

Furthermore, on the occasion of configuring the white glass container of the present invention, it is preferable to decrease the content of CaO in the white transparent layer to be smaller than the content of CaO in the white opaque layer.

For example, when the white glass container is configured by considering the relation between the content of CaO in the white transparent layer and the content of CaO in the white opaque layer that are measured using wavelength dispersive fluorescent X-ray spectrometry, even in a case in which the melting conditions or molding conditions for the glass composition have been slightly changed, a white glass container which has a white multilayer structure derived from a phase separation phenomenon of the composition for glass and has less foreign materials generated at the surface, can be obtained by molding the glass composition using a predetermined mold or the like.

Meanwhile, the contents of CaO in the white transparent layer and the white opaque layer can also be controlled to values in a desired range, similarly to the content of $P_2O_5$ described above, by implementing the control processes (1) to (6) singly, or implementing the processes in appropriate combinations.

On the occasion of configuring the white glass container of the present invention, it is preferable to adjust the average particle size of the white crystals in at least the white opaque layer to a value below 400 nm.

By controlling the average particle size of the white crystals produced in the white opaque layer or the like as such, white coloration in the white opaque layer or the like can be quantitatively controlled.

Above all, when the average particle size of such white crystals is controlled, this leads to suppression of the generation of foreign materials, so that a white glass container which exhibits superior white coloration as well as excellent surface smoothness can be obtained.

Of course, also by controlling the average particle size of the white crystals produced in the white transparent layer to a similar value, the white coloration or surface smoothness in the white transparent layer can be accurately controlled.

Furthermore, on the occasion of configuring the white glass container of the present invention, it is preferable to adjust the degree of whiteness (may be referred to as L value; hereinafter, the same) measured according to JIS Z 8730 in the neck portion to a value of 40 or larger but below 80.

As such, by configuring the white glass container by taking the degree of whiteness in the neck portion into consideration, a white glass container which exhibits excellent mechanical strength, white coloration and the like particularly in the neck portion can be obtained.

Furthermore, on the occasion of configuring the white glass container of the present invention, it is preferable to adjust the degree of whiteness in the body portion as measured according to JIS Z 8730 to a value of 80 or larger.

As such, by configuring the white glass container by taking the degree of whiteness in the body portion into consideration, a white glass container which exhibits excellent mechanical strength, white coloration and the like particularly in the body portion can be obtained.

Furthermore, on the occasion of configuring the white glass container of the present invention, it is preferable that the neck portion does not have a white opaque layer having a degree of whiteness of 80 or more as measured according to JIS Z 8730 in the neck portion, while the body portion has a multilayer structure including a white transparent layer having a degree of whiteness of below 80 as measured according to JIS Z 8730 and a white opaque layer having a degree of whiteness of 80 or more as measured according to JIS Z 8730.

By configuring the white glass container as such, a white glass container which exhibits predetermined white coloration on the whole and also exhibits excellent mechanical strength can be obtained.

According to another embodiment of the present invention, there is provided a method for producing a white glass container derived from a phase separation phenomenon of a glass composition and having at least a neck portion and a body portion, the white glass container containing, as ingredients, at least $SiO_2$, $P_2O_5$, $Al_2O_3$, $B_2O_3$, $R_2O$ (R=Na or K), ZnO and CaO, or at least $SiO_2$, $P_2O_5$, $Al_2O_3$, $B_2O_3$, $R_2O$ (R=Na or K), MgO and CaO, in which method the body portion has, in a portion or in the entirety, a white multilayer structure configured to successively include a white transparent layer of relatively low white coloration and a white opaque layer of relatively high white coloration from the outer surface side toward the inner surface side; the content of $P_2O_5$ in the white transparent layer is smaller than the content of $P_2O_5$ in the white opaque layer; and the method includes the following Step 1 and Step 2:

Step 1: a step of preparing a composition for glass including, as ingredients, at least $SiO_2$, $P_2O_5$, $Al_2O_3$, $B_2O_3$, $R_2O$ (R=Na or K), ZnO and CaO, or at least $SiO_2$, $P_2O_5$, $Al_2O_3$, $B_2O_3$, $R_2O$ (R=Na or K), MgO and CaO, and melting the glass composition; and Step 2: a step of molding the molten composition for glass by a one-press method using a mold and a plunger, and slowly cooling the composition, so as to obtain a white glass container having a three-layer structure derived from a phase separation phenomenon of the glass composition, in a portion or the entirety of the neck portion and the body portion.

That is, by producing a white glass container as such, when a halogen-free glass composition that does not include a significant amount of fluorine compounds is used, and even in a case in which the melting conditions or molding conditions for the relevant glass composition have been slightly changed, when the relevant glass composition is molded using a predetermined mold (for example, mold for one-press method) or the like, a white glass container having a white multilayer structure (three-layer structure) derived from a phase separation phenomenon of the composition for glass while having less foreign material generated at the surface, can be efficiently obtained.

According to another embodiment of the present invention, there is provided a method for producing a white glass container derived from a phase separation phenomenon of a glass composition and having at least a neck portion and a body portion, the glass container containing, as ingredients, at least $SiO_2$, $P_2O_5$, $Al_2O_3$, $B_2O_3$, $R_2O$ (R=Na or K), ZnO and CaO, or at least $SiO_2$, $P_2O_5$, $Al_2O_3$, $B_2O_3$, $R_2O$ (R=Na or K), MgO and CaO, in which method the body portion has, in a portion or in the entirety, a white multilayer structure configured to successively include a white transparent layer of relatively low white coloration and a white opaque layer of relatively high white coloration from the outer surface side toward the inner surface side; the content of $P_2O_5$ in the white transparent layer is smaller than the content of $P_2O_5$ in the white opaque layer; and the method includes the following Step 1' and Step 2':

Step 1': a step of preparing a composition for glass including, as ingredients, at least $SiO_2$, $P_2O_5$, $Al_2O_3$, $B_2O_3$, $R_2O$ (R=Na or K), ZnO and CaO, or at least $SiO_2$, $P_2O_5$, $Al_2O_3$, $B_2O_3$, $R_2O$ (R=Na or K), MgO and CaO, and melting the glass composition; and Step 2': a step of molding the molten composition for glass by a blowing method using a mold and cooling air, and slowly cooling the composition, so as to obtain a white glass contain having a two-layer structure derived from a phase separation phenomenon of a glass composition, in a portion or the entirety of the neck portion and the body portion.

That is, by producing a white glass container as such, when a halogen-free glass composition that does not contain a significant amount of fluorine compounds is used, and even in a case in which the melting conditions or molding conditions for a glass composition have been slightly changed, when the relevant glass composition is molded using a predetermined mold (a mold for a blow/blow method or a mold for a press/blow method) or the like, a white glass container having a white multilayer structure (two-layer structure) derived from a phase separation phenomenon of a composition for glass while having less foreign material generated at the surface, can be efficiently obtained.

Furthermore, on the occasion of performing the method for producing a white glass container of the present invention, it is preferable that the degree of whiteness as measured according to JIS Z 8730 in the white transparent layer of relatively low white coloration in at least the body portion, is adjusted to a value of below 80, and the degree of whiteness as measured according to JIS Z 8730 in the white transparent layer of relatively low white coloration to a value of 80 or more.

That is, when a white glass container is produced by taking the degree of whiteness in at least the body portion into consideration as such, a white glass container having excellent mechanical strength, white coloration and the like particularly in the body portion can be efficiently obtained.

BRIEF DESCRIPTION OF DRAWINGS

FIG. 2(*b*) is a diagram provided to explain the white multilayer structure (three-layer structure) in a white glass container produced by a blow method (blow/blow method).

MODE(S) FOR CARRYING OUT THE INVENTION

First Embodiment

Figure 1A:
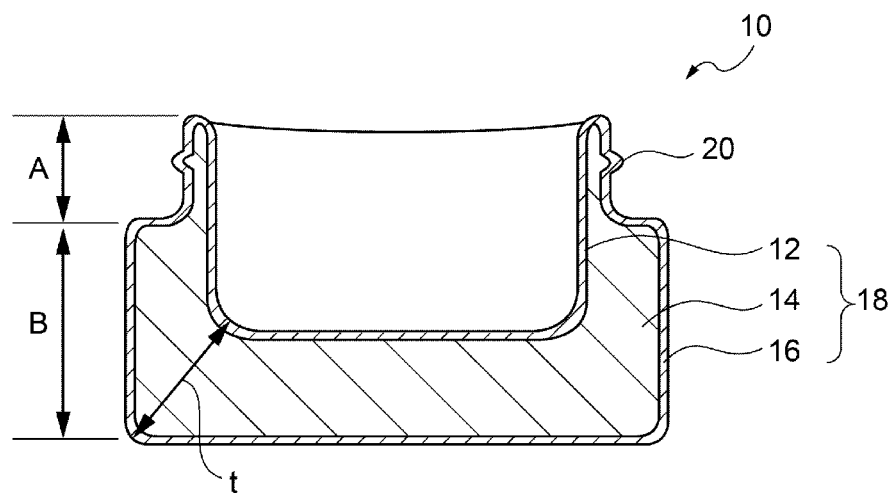
FIGS. 1(*a*) and 1(*b*) are diagrams provided to explain the white multilayer structure (three-layer structure) in a white glass container produced by a one-press method.

According to a first embodiment, there is provided a white glass container derived from a phase separation phenomenon of a glass composition and having at least a neck portion and a body portion, in which the glass composition includes, as ingredients, at least $SiO_2$, $P_2O_5$, $Al_2O_3$, $B_2O_3$, $R_2O$ (R=K or Na), $K_2O$, ZnO and CaO (formulation A), or at least $SiO_2$, $P_2O_5$, $Al_2O_3$, $B_2O_3$, $R_2O$ (R=K or Na), MgO and CaO (formulation B); the body portion has, in a portion or in the entirety, a white multilayer structure formed to successively include a white transparent layer of relatively low white coloration and a white opaque layer of relatively high white coloration from the outer surface (outermost surface of the glass container) toward the inner surface (innermost surface of the glass container); and the content of $P_2O_5$ in the white transparent layer is made smaller than the content of $P_2O_5$ in the white opaque layer. Thus, the problems described above can be addressed.

In the following description, the white glass container of the first embodiment will be specifically explained, including the types of glass components that constitute the white glass container and the proportions of the formulation.

Meanwhile, in regard to the formulation of glass components, there are formulation A and formulation B, and the difference lies in that ZnO is one of essential components while MgO is an optional component in the formulation A, and MgO is one of essential components while ZnO is an optional component in the formulation B.

1. Glass components constituting white glass container (assuming a molten glass state, that is, the feed amounts)

(1) $SiO_2$

While being commonly used in the first formulation and the second formulation, $SiO_2$ is a glass component that constitutes a white glass container, and is a fundamental component that forms a network structure of glass, irrespective of the presence or absence of the white multilayer structure.

That is, this is a glass component basically intended for obtaining an amorphous structure and exhibiting excellent mechanical strength, weather resistance or gloss.

Here, it is preferable that the amount of incorporation of $SiO_2$ is adjusted to a value within the range of 45% to 65% by weight with respect to the total amount (100% by weight; hereinafter, the same) of the glass components.

The reason for this is that if the amount of incorporation of $SiO_2$ as such is below 45% by weight, weather resistance and moisture resistance of the white glass container may be deteriorated.

On the other hand, it is because if the amount of incorporation of $SiO_2$ as such is above 65% by weight, the melting temperature of the glass components may rise excessively, or uniform miscibility with other glass components may decrease.

Therefore, from the viewpoint that the balance between such weather resistance or the like and the melting temperature of the glass components, it is more preferable to adjust the amount of incorporation of $SiO_2$ to a value within the range of 50% to 63% by weight, and even more preferably to a value within the range of 52% to 62% by weight.

(2) $P_2O_5$

While being commonly used in formulation A and formulation B, $P_2O_5$ is a basic glass component intended to cause a phase separation phenomenon in relation to $SiO_2$, CaO and the like, and accelerate whitening of glass.

Therefore, it is preferable that the amount of incorporation of $P_2O_5$ is adjusted to a value within the range of 2% to 8% by weight with respect to the total amount of the glass composition.

That is, it is because if the amount of incorporation of $P_2O_5$ has a value of below 2% by weight, phase separation may become insufficient, and the glass may have insufficient whiteness or be colored.

On the other hand, it is because if the amount of incorporation of $P_2O_5$ is above the range of 8% by weight, it may be difficult to obtain uniform dispersibility with $SiO_2$, the white color may become noticeably uneven, and the aesthetic appearance of glass may be impaired.

Therefore, from the viewpoint that a more satisfactory balance is achieved between whiteness and the aesthetic appearance, it is more preferable to adjust the amount of incorporation of $P_2O_5$ to a value within the range of 3% to 7.5% by weight, and even more preferably to a value within the range of 4% to 7% by weight.

(3) $Al_2O_3$

Furthermore, while being commonly used in formulation A and formulation B, $Al_2O_3$ exhibits a function of decreasing the chemical durability or the coefficient of thermal expansion of the white glass container, and also has a function of significantly increasing the dispersion stability with $SiO_2$ and other components and making the phase separation of glass become uniform and easy.

Thus, it is characterized in that the amount of incorporation of $Al_2O_3$ as such is adjusted to a value within the range of 5% to 9% by weight with respect to the total amount of the glass composition.

That is, it is because if the amount of incorporation of $Al_2O_3$ has a value of below 5% by weight, uniform dispersion with $SiO_2$ and other components may occur insufficiently, and the resulting white glass is likely to have unevenness.

On the other hand, it is because if the amount of incorporation of $Al_2O_3$ is above 9% by weight, the melting temperature of the glass composition may rise significantly, and moldability may be excessively deteriorated.

Therefore, in order to achieve a more satisfactory balance between dispersion stability and the melting temperature of the glass composition or the like, it is preferable that the amount of incorporation of $Al_2O_3$ is adjusted to a value within the range of 5.5% to 8.5% by weight, and more preferably to a value within the range of 6% to 8% by weight.

(4) $B_2O_3$

Furthermore, while being commonly used in formulation A and formulation B, $B_2O_3$ is a glass component intended for decreasing the viscosity at high temperature of the glass composition by exhibiting a flux effect, and enhancing moldability and weather resistance of the resulting white glass container.

Therefore, it is characterized in that the amount of incorporation of $B_2O_3$ as such is adjusted to a value within the range of 1% to 13% by weight with respect to the total amount of the glass composition.

That is, it is because if the amount of incorporation of $B_2O_3$ has a value of below 1% by weight, meltability of the composition for glass or moldability of the resulting white glass container may be markedly deteriorated. In contrast, it is because if the amount of incorporation of $B_2O_3$ is above 13% by weight, the melting temperature of the glass composition may rise excessively.

Therefore, in order for the balance between meltability of the composition for glass and moldability of the resulting white glass container or the like, it is more preferable to adjust the amount of incorporation of $B_2O_3$ to a value within the range of 1.5% to 12% by weight, and even more preferably to a value within the range of 1.8% to 3% by weight, with respect to the total amount.

(5) $R_2O$ (R=Na or K)

While being commonly used in formulation A and formulation B, $R_2O$ (R=Na or K) is a glass component intended for enhancing meltability of the glass composition, decreasing the viscosity, and thereby enhancing moldability of the white glass container.

Particularly, when $R_2O$ is $K_2O$, it is a glass component that makes the temperature gradient gentle at the time of melting the glass composition, makes the operation temperature range wider, also suppresses the movement of Na ions in the glass by means of a so-called mixed alkali effect, and can impart gloss to the glass surface.

Therefore, it is preferable to adjust the amount of incorporation of $R_2O$ as such to a value within the range of 5% to 12% by weight with respect to the total amount of the glass composition.

That is, it is because if the amount of incorporation of $R_2O$ has a value of below 5% by weight, the addition effect of decreasing the viscosity may not be manifested. In contrast, it is because if the amount of incorporation is above 12% by weight, weather resistance of glass may decrease, the coefficient of thermal expansion may increase excessively, or the phase separation reaction may be inhibited so that white coloration may be deteriorated.

Therefore, from the viewpoint that a more satisfactory balance is achieved between the effect of adding $R_2O$ and meltability of the like of the glass composition, it is more preferable to adjust the amount of incorporation of $R_2O$ to a value within the range of 6% to 10% by weight, and even more preferably to a value within the range of 7% to 9% by weight.

Meanwhile, in regard to $R_2O$, since $Na_2O$ can be used in place of $K_2O$, in a case in which $K_2O$ is not at all used, the amount of incorporation of $R_2O$ is equal to that of $Na_2O$, it is preferable to adjust the amount of incorporation to a value within the range of 6% to 18% by weight with respect to the total amount of the glass composition.

(6) ZnO/MgO

Furthermore, ZnO is an essential component of the formulation A, and is an optical component in the formulation B; however, ZnO is a glass component intended for manifesting a flux effect through addition of a small amount thereof, increasing meltability of the glass composition, and also decreasing the coefficient of thermal expansion or enhancing weather resistance.

Similarly, MgO is an essential component of the formulation B, and is an optional component of the formulation A; however, MgO is relatively lighter in weight than ZnO and is a glass component intended to manifesting a flux effect through addition of a small amount thereof, increasing meltability of the glass composition, and also decreasing the coefficient of thermal expansion or enhancing weather resistance. That is, MgO is a preferable glass component from the viewpoint that MgO controls the relation between the $P_2O_5$ content in the white transparent layer and the $P_2O_5$ content in the white opaque layer, decreases the coefficient of thermal expansion of glass, or promotes the $Al_2O_3$ dispersing effect described above.

Therefore, it is characterized in that the amount of incorporation of ZnO or MgO as such is adjusted to a value within the range of 3% to 10% by weight with respect to the total amount of the glass composition.

That is, it is because if the amount of incorporation of ZnO or MgO has a value of below 3% by weight the addition effect or the like may not be manifested.

On the other hand, it is because if the amount of incorporation of ZnO or MgO is above 10% by weight, meltability of the glass composition may be decreased, and accordingly, the surface smoothness of the resulting white glass may be lost, and the surface may become rough and matte.

Therefore, from the viewpoint that a more satisfactory balance is achieved between such an addition effect and meltability of the glass composition or the like, it is more preferable to adjust the amount of incorporation of ZnO or MgO to a value within the range of 2% to 8% by weight, and even more preferable to adjust the value within the range of 3% to 6% by weight.

However, while being commonly used in the formulation A and the formulation B, MgO can be used as a substitute for the entirety or a portion of ZnO, and in that case, the total amount of incorporation of ZnO+MgO may be set to 3% to 10% by weight.

Therefore, in a case in which ZnO is not at all used in the second formulation, the amount of incorporation of MgO may be set to 3% to 10% by weight.

Also, in a case in which MgO is used as a substitute for ZnO, that is, although this matter is related to the second formulation, it is preferable to adjust the blending ratio of Ca/MgO to a value within the range of 0.5 to 2.

The reason for this is that if the blending ratio of Ca/MgO as such is below 0.5, growth of calcium phosphate crystals that exhibit white coloration proceeds insufficiently, it becomes difficult to control the relation between the $P_2O_5$ content in the white transparent layer and the $P_2O_5$ content in the white opaque layer, and a white transparent layer or a white opaque layer, each having a desired degree of whiteness, may not be obtained.

On the other hand, it is because if the blending ratio of Ca/MgO is above 2, growth of calcium phosphate crystals exhibiting white coloration proceeds excessively, and surface smoothness of the resulting white glass is lost while the surface becomes rough and matte, or similarly to the case of making the growth insufficient, it may be difficult to control the relation between the $P_2O_5$ content in the white transparent layer and the $P_2O_5$ content in the white opaque layer.

Therefore, in a case in which MgO is used as a substitute for ZnO, it is more preferable to adjust the blending ratio of Ca/MgO to a value within the range of 1 to 1.8, and even more preferably to a value within the range of 1.3 to 1.5.

(7) CaO

While being commonly used in formulation A and formulation B, CaO is incorporated as a supply raw material for calcium phosphate crystals that exhibit a function of lowering the viscosity at high temperature of the glass composition and exhibits white coloration.

Therefore, it is characterized in that the amount of incorporation of CaO to a value within the range of 3% to 12% by weight with respect to the total amount of the glass composition.

That is, it is because if the amount of incorporation of CaO has a value of below 3% by weight, the phase separation reaction occurs to a reduced extent so that whiteness may be markedly deteriorated. In contrast, it is because if the amount of incorporation of CaO is above 12% by weight, the melting temperature of the glass composition may rise, or the coefficient of thermal expansion may increase.

Therefore, in order to achieve a more satisfactory balance between the whiteness in the resulting glass container and the melting temperature of the glass composition, it is more preferable to adjust the amount of incorporation of CaO to a value within the range of 5% to 9% by weight, and even more preferably to a value within the range of 6% to 8% by weight.

(8) $LiO_2$, $SO_3$, BaO, and Others (8)-1 $LiO_2$

While being common to formulation A and formulation B, $LiO_2$ is a glass component intended for enhancing meltability of the composition for glass, moldability of the resulting white glass container, or the like through addition of a relatively small amount thereof.

Therefore, it is preferable to adjust the amount of incorporation of $LiO_2$ to a value within the range of 0.1% to 5% by weight with respect to the total amount of the glass composition.

That is, it is because if the amount of incorporation of $LiO_2$ has a value of below 0.1% by weight, meltability of the glass composition may be excessively deteriorated, and on the other hand, it is because if the amount of incorporation of $LiO_2$ is above 5% by weight, moldability and the like of the resulting white glass container are markedly deteriorated.

Therefore, it is more preferable to adjust the amount of incorporation of LiO2 to a value within the range of 0.5% to 4% by weight, and even more preferably to a value within the range of 1% to 3% by weight, with respect to the total amount.

(8)-2 $SO_3$

Furthermore, while being common to formulation A and formulation B, $SO_3$ is a preferable glass component from the viewpoint of improving meltability of the glass composition that forms white glass and simultaneously enhancing whiteness of the resulting white glass.

That is, it is preferable to adjust the amount of incorporation of $SO_3$ to a value within the range of 0.1% to 5% by weight with respect the total amount of the glass composition.

The reason for this is that if the amount of incorporation of $SO_3$ has a value of below 0.1% by weight, meltability of the glass composition or the moldability, whiteness and the like of the resulting white glass container may be excessively deteriorated. On the other hand, it is because if the amount of incorporation of $SO_3$ is above 5% by weight, inconveniences such as excessive foaming at the time of melting the glass composition may occur.

Therefore, from the viewpoint of achieving a more satisfactory balance between meltability of the glass composition, foaming properties at the time of melting the glass composition, and the like, it is more preferable to adjust the amount of incorporation of $SO_3$ to a value within the range of 0.2% to 3% by weight, and even more preferably to a value within the range of 0.5% to 2% by weight, with respect to the total amount.

(8)-3 BaO

While being common to formulation A and formulation B, BaO is a glass component intended for enhancing meltability of the composition for glass, moldability of the resulting white glass container, and the like through addition of a relatively small amount thereof.

That is, it is preferable to adjust the content of BaO to a value within the range of 0.1% to 5% by weight with respect to the total amount of the glass composition.

The reason for this is that if the amount of incorporation of BaO has a value of below 0.1% by weight, meltability of the glass composition may be excessively deteriorated. On the other hand, it is because if the amount of incorporation of BaO is above 5% by weight, moldability of the resulting white glass container may be markedly deteriorated.

Therefore, it is more preferable to adjust the amount of incorporation of BaO to a value within the range of 0.5% to 4% by weight, and even more preferably to a value within the range of 1% to 3% by weight, with respect to the total amount.

(8)-4 Other Glass Components

Furthermore, while being common to formulation A and formulation B, it is preferable that the glass composition includes at least one metal oxide selected from the group consisting of $TiO_2$, SrO, $ZrO_2$, $Sb_2O_3$, $Cs_2O$, $SnO_2$ and PbO.

For example, $TiO_2$ is a preferable glass component from the viewpoint of enhancing whiteness of the resulting white glass container, increasing meltability of the glass composition, and also decreasing the coefficient of thermal expansion or promoting the $Al_2O_3$ dispersing effect described above.

Furthermore, SrO is a preferable glass component from the viewpoint of having an effect of enhancing meltability of the glass composition.

$ZrO_2$ is a suitable glass component from the viewpoint of whitening the glass and markedly enhancing chemical durability.

$Sb_2O_3$ is a suitable glass component from the viewpoint of enhancing foam breaking in the glass, and $Cs_2O_3$, $SnO_2$ and PbO are suitable glass components from the viewpoint of enhancing whiteness of the glass or enhancing chemical durability of the glass.

Therefore, it is preferable to adjust the respective amounts of incorporation of the glass components to values within the range of 0.1% to 10% by weight, and more preferably to values within the range of 0.5% to 5% by weight, with respect to the total amount of the glass composition.

It is because if the respective amounts of incorporation have values of below 0.1% by weight, the addition effect may not be manifested. On the other hand, it is because if the respective amounts of incorporation are above 10% by weight, meltability of the glass composition may be decreased in the case of $TiO_2$ or MgO, and the coefficient of thermal expansion of the glass may be increased in the case of SrO.

Meanwhile, when the glass components are used in combination with MgO or SrO, a so-called solid solution effect may be obtained, and thus these are suitable glass components from the viewpoint of decreasing the coefficient of thermal expansion of glass while enhancing meltability of the glass composition.

In addition to that, it has been confirmed that even if polyvalent oxide components formed from $Nb^{5+}$, $Ta^{5+}$, $W^{6+}$ and $Mo^{6+}$ are incorporated in addition to the oxides described above, an excellent phase separation effect may be obtained, and it is also suitable to color the glass into favorable color tones such as pastel shades, by adding colorants to the glass components.

For example, when colorants formed from $Co^{2+}$, $Cu^{2+}$, $Fe^{2+}$, $Ni^{2+}$, $Co^{3+}$, $Cr^{3+}$, $Fe^{3+}$, $Mn^{3+}$, $Nb^{3+}$, $Pr^{3+}$, $Er^{3+}$, $Cr^{6+}$ and the like are used among the glass components, they produce various colors, and pastel shades can be realized. Therefore, colorants are suitable glass components.

On the other hand, in a case in which it is wished to obtain a glass container that is rich in whiteness without being colored, it is preferable to adjust the content of Fe ions and the like included in the composition for glass to a value of 250 ppm or less.

That is, for example, it has been found that if the content of Fe ions included in the composition for glass is above 250 ppm, in a case in which relevant Fe ions are reduced from trivalence to divalence, a composition for bluish celadon-like glass is likely to be obtained.

Therefore, in a case in which it is wished to obtain a white glass container that is rich in whiteness without being colored, it is preferable to adjust the content of Fe ions included in the composition for glass to, for example, a value of 250 ppm or less, more preferably to a value within the range of 50 to 220 ppm, and even more preferably to a value within the range of 100 to 200 ppm.

However, in a case in which it is wished to obtain a white glass container that is colored in a celadon-like manner, it is preferable to adjust the content of Fe ions included in the composition for glass to, for example, a value within the range of above 250 ppm and 800 ppm or less, more preferably to a value within the range of 300 to 600 ppm, and even more preferably to a value within the range of 350 to 500 ppm.

(9) Oxidizing Agent

Furthermore, while being common to formulation A and formulation B, it is preferable that $CeO_2$, a nitrate or the like is incorporated as an oxidizing agent, and the amount of incorporation of the relevant $CeO_2$, nitrate or the like is adjusted to a value within the range of 0.01% to 2% by weight with respect to the total amount of the composition for glass.

The reason for this is that in a case in which water for dispersing the glass components is added from the outside into the composition for glass, and a reducing atmosphere is established, $CeO_2$, a nitrate or the like as the oxidizing agent should convert the reducing atmosphere to an oxidizing atmosphere, and coloration of the composition for glass caused by iron ions and the like should be effectively prevented.

Therefore, it is more preferable to adjust the amount of incorporation of $CeO_2$, a nitrate or the like as the oxidizing agent to a value within the range of 0.02% to 2.0% by weight, and even more preferably to a value within the range of 0.04% to 1.5% by weight, with respect to the total amount.

(10) Achromatizing Component

While being common to formulation A and formulation B, it is preferable that $Er_2O_3$ is incorporated, and also, the amount of incorporation of the relevant $Er_2O_3$ is adjusted to a value within the range of 0.001% to 0.5% by weight with respect to the total amount.

The reason for this is that in a case in which a white glass container is easily colored bluish, when $Er_2O_3$ that functions as an achromatizing agent is incorporated, it is intended to effectively prevent coloration in the white glass container by utilizing the complementary color relation of the relevant $Er_2O_3$.

Therefore, it is more preferable to adjust the amount of incorporation of $Er_2O_3$ as an achromatizing component to a value within the range of 0.002% to 0.1% by weight, and even more preferably to a value within the range of 0.003% to 0.08% by weight, with respect to the total amount.

However, in a case in which it is wished to obtain a reddish white glass container, $Er_2O_3$ is a particularly preferable ingredient, and it can be said that it is preferable to use the component in a slightly excess amount.

That is, in such a case, it is preferable to adjust the amount of incorporation of $Er_2O_3$ to a value within the range of above 0.5% by weight and 5% by weight or less, more preferably to a value within the range of 0.8% to 4% by weight, and even more preferably to a value within the range of 1% to 3% by weight, with respect to the total amount of the composition for glass.

(11) Cullet Component

Furthermore, while being common to the first formulation and the second formulation, it is preferable that a predetermined amount of a cullet component is incorporated into the formulation.

The reason for this is that when such a cullet component is incorporated, meltability and uniformity of the glass composition are enhanced, and also, a composition for glass that should be disposed of can be recycled so that it is economically efficient and environmentally advantageous.

Therefore, it is preferable to adjust the content of such a cullet component to a value within the range of 5% to 50% by weight, more preferably to a value within the range of 10% to 40% by weight, and even more preferably to a value within the range of 15% to 30% by weight, with respect to the total amount of the composition for glass.

2. White Multilayer Structure

As illustrated in FIG. 1(a), a white glass container 10 has, in a portion or the entirety of a neck portion (A) and a body portion (B), respectively, a white multilayer structure (three-layer structure) 18 that is derived from a phase separation phenomenon of a composition for glass and is formed to successively include, from the outer surface side toward the inner surface side, a white transparent layer 16 (first white transparent layer) of relatively low white coloration, a white opaque layer 14 of relatively high white coloration, and a white transparent layer 12 (second white transparent layer) of relatively low white coloration.

Figure 1B:
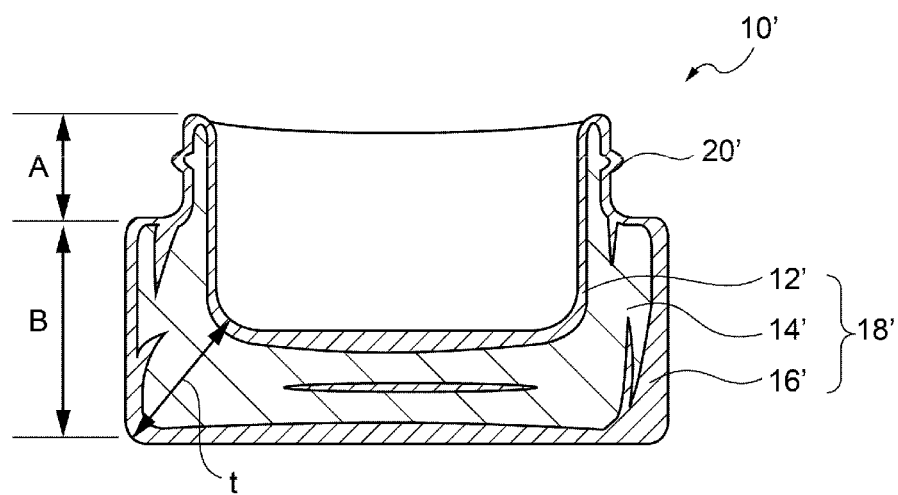

Furthermore, the white glass container 10' illustrated in FIG. 1(b) is a white glass container 10' having a white multilayer structure (three-layer structure) 18' in a portion or the entirety of a neck portion (A) and a body portion (B), respectively; however, this is an example in which the phase separation phenomenon occurs partially insufficiently, and a portion of the white transparent layer region is formed not only on the inner surface side and the outer surface side but also in the white opaque layer 14'.

Figure 2A:
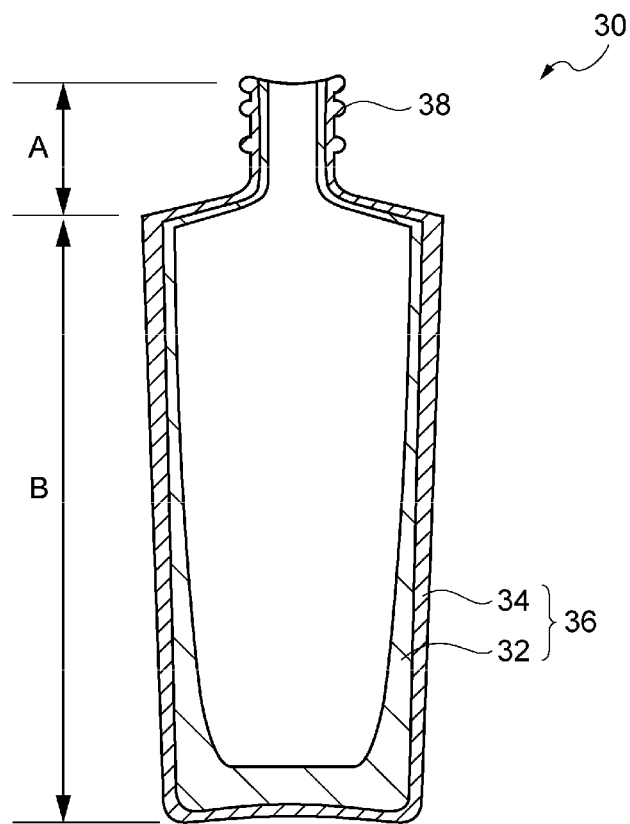
FIG. 2(*a*) is a diagram provided to explain the white multilayer structure (two-layer structure) in a white glass container produced by a blow method (blow/blow method)

Furthermore, as illustrated in FIG. 2(a), the white glass container 30 has, in a portion or the entirety of a neck portion (A) and a body portion (B), a white multilayer structure (two-layer structure) 36 formed to successively include, from the outer surface side toward the inner surface side, a white transparent layer 34 of relatively low white coloration and a white opaque layer 32 of relatively high white coloration.

Figure 2B:
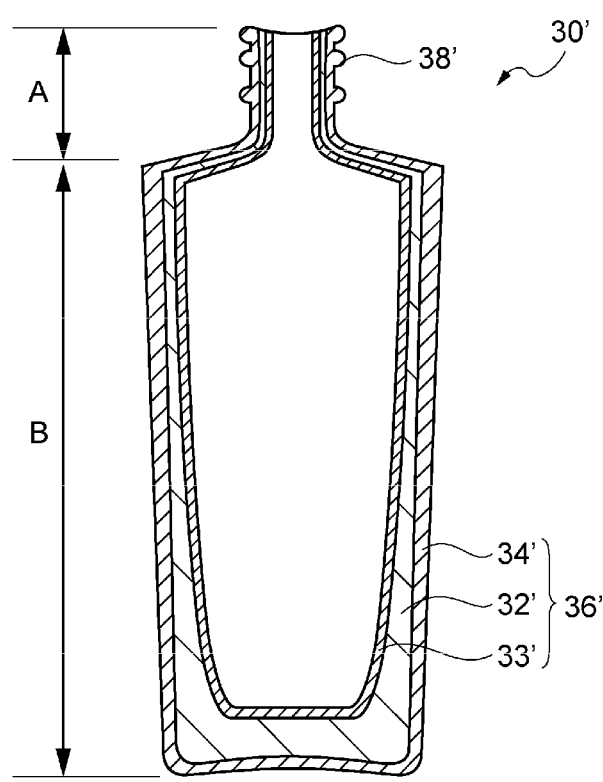

Furthermore, as illustrated in FIG. 2(b), the white glass container 30' has, in a portion or the entirety of a neck portion (A) and a body portion (B), a white multilayer structure (three-layer structure) 36' formed to successively include, from the outer surface side toward the inner surface side, a white transparent layer (first white transparent layer) 34' of relatively low white coloration, a white opaque layer 32' of relatively high white coloration, and a white transparent layer (second white transparent layer) 33' of relatively low white coloration.

In regard to such white transparent layers 12, 12', 16, 16', 33', 34 and 34', and white opaque layers 14, 14', 32 and 32', it is characterized in that the content of $P_2O_5$ in the white transparent layer is made smaller than the content of $P_2O_5$ in the white opaque layer, and more suitably, the content of CaO in the white transparent layer is also made smaller than the content of CaO in the white opaque layer.

In the following description, the white multilayer structure formed by including a phase separation region in the white glass container will be divided into a white transparent layer and a white opaque layer, and the respective layers will be specifically explained.

(1) White Transparent Layer

Furthermore, white transparent layers 12 and 16 illustrated in FIG. 1(a) are glass regions in an amorphous state, in which phase separation to a small extent, there are relatively fewer phase separation grains, and the colloidal region is relatively large, and the white transparent layers are provided in order to provide mechanical protection for the white opaque layer 14 and the like, and to enhance overall whiteness of the white glass container 10 and the like.

Therefore, it is preferable to adjust the thickness of such white transparent layers 12 and 16 to a value within the range of 0.001 to 10 mm.

The reason for this is that if the thickness of the white transparent layers 12 and 16 has a value of below 0.001 mm, it may be difficult to secure mechanical protection of the white opaque layer.

On the other hand, it is because if the thickness of the white transparent layers 12 and 16 is above 10 mm, the overall whiteness in the glass container may be markedly deteriorated.

Therefore, it is preferable to adjust the thickness of the white transparent layers 12 and 16 to a value within the range of 0.01 to 8 mm, and more preferably to a value within the range of 0.1 to 5 mm.

Furthermore, it is preferable that the white transparent layers 12 and 16 attributed to formulation A are as follows with respect to the total amount (100% by weight).

$SiO_2$: 50% to 66% by weight (more preferably, 55% to 63% by weight)

$P_2O_5$: 1% to 3% by weight (more preferably, 1.5% to 2.5% by weight)

$Al_2O_3$: 5% to 10% by weight (more preferably, 6% to 9% by weight)

$B_2O_3$: 1% to 13% by weight (more preferably, 1.5% to 5% by weight)

R$_2$O (R=Na or K): 6% to 18% by weight (more preferably, 10% to 17% by weight)

ZnO: 3% to 10% by weight (more preferably, 3.5% to 6% by weight)

CaO: 3% to 10% by weight (more preferably, 4% to 6% by weight)

The reason for this is that by configuring a white glass container by taking the proportions of the formulation for the white transparent layers 12 and 16 as such, even in a case in which the melting conditions or molding conditions for the glass composition have been slightly changed, a white glass container having a white multilayer structure derived from a phase separation phenomenon of a composition for glass and having less foreign material generated at the surface can be obtained by molding the glass composition using a predetermined mold or the like.

Furthermore, it is preferable that the white transparent layers 12 and 16 attributed to formulation B is as follows with respect to the total amount (100% by weight), from the viewpoint of stably forming a predetermined white multilayer structure and having less foreign material generated at the surface.

SiO$_2$: 50% to 66% by weight (more preferably, 55% to 63% by weight)

P$_2$O$_5$: 1% to 3% by weight (more preferably, 1.5% to 2.5% by weight)

Al$_2$O$_3$: 5% to 10% by weight (more preferably, 6% to 9% by weight)

B$_2$O$_3$: 1% to 13% by weight (more preferably 1.5% to 5% by weight)

R$_2$O (R=Na or K): 6% to 18% by weight (more preferably, 10% to 17% by weight)

MgO: 3% to 10% by weight (more preferably, 3.5% to 6% by weight)

CaO: 3% to 10% by weight (more preferably, 4% to 6% by weight)

It is preferable to adjust the visible light transmittance of such white transparent layers 12 and 16 to a value within the range of 5% to 50%.

The reason for this is that if the visible light transmittance of such white transparent layers 12 and 16 is below 5%, opaqueness may increase, visibility of the white opaque layer 14 that is an underlayer and is rich in whiteness may be decreased, and whiteness of the white glass container 10 may be markedly decreased.

On the other hand, it is because if the visible light transmittance of the white transparent layers 12 and 16 is above 50%, transparency may increase excessively, whiteness in the threaded portion or the like is markedly decreased, and integral whiteness of the white glass container 10 may be markedly impaired.

Therefore, it is preferable to adjust the visible light transmittance of the white transparent layers 12 and 16 to a value within the range of 10% to 40%, and more preferably to a value within the range of 15% to 30%.

Furthermore, it is preferable to adjust the average particle size of the white crystals produced in the white transparent layer to a value of below 400 nm.

The reason for this is that when the average particle size of the white crystals produced at least in the white transparent layer is controlled to a value of below a predetermined value as such, white coloration in the white transparent layer can be quantitatively controlled.

It is also because when the average particle size of such white crystals is controlled to a value of below a predetermined value, generation of foreign material can be suppressed, and a white glass container having excellent surface smoothness can be obtained.

More specifically, it is because if the average particle size of the white crystals has a value of 400 nm or more, white coloration in the white transparent layer may fluctuate, or the frequency of the generation of foreign material at the surface of the white glass container may be markedly increased.

However, it is because if the average particle size of the white crystals becomes excessively small, it may become difficult to control the value per se, or in contrast, it may become difficult to control white coloration.

Therefore, it is more preferable to adjust the average particle size of the white crystals produced in the white transparent layer to a value within the range of 1 to 300 nm, and even more preferably to a value within the range of 8 to 80 nm.

Of course, when the average particle size of the white crystals produced in the white opaque layer that will be described below is controlled to a value in a similar range, quantitative control of whiteness in the white opaque layer or satisfactory control of surface smoothness is made easier.

(2) White Opaque Layer

Furthermore, the white opaque layer 14 illustrated in FIG. 1(*a*) or the like is a glass region in an amorphous state, in which phase separation occurs to a large extent, there are relatively many phase separation grains, and the colloidal region is relatively small, and the white opaque layer is provided in order to enhance the overall whiteness of the white glass container 10.

Therefore, it is preferable to adjust the thickness of such a white opaque layer 14 to a value within the range of 1 to 25 mm.

The reason for this is that if the thickness of the white opaque layer 14 as such is below 1 mm, the overall whiteness of the glass container 10 may be markedly deteriorated. On the other hand, it is because if the thickness of the white opaque layer 10 as such is above 25 mm, it may become difficult to secure mechanical protection of the white opaque layer 10, and further mechanical protection of the entire glass container 10.

Therefore, it is preferable to adjust the thickness of the white opaque layer 14 to a value within the range of 3 to 20 mm, and more preferably to a value within the range of 7 to 15 mm.

It is preferable that the proportions of the formulation in the white opaque layer 14 attributed to formulation A are as follows with respect to the total amount (100% by weight).

SiO$_2$: 45% to 61% by weight (more preferably, 50% to 60%.

P$_2$O$_5$: above 3% to 8% by weight (more preferably, 5% to 7% by weight)

Al$_2$O$_3$: 5% to 9% by weight (more preferably, 6% to 8.5% by weight)

B$_2$O$_3$: 1% to 13% by weight (more preferably, 1.5% to 5% by weight)

R$_2$O (R=Na or K): 6% to 18% by weight (more preferably, 10% to 17% by weight)

ZnO: 3% to 10% by weight (more preferably, 5% to 7% by weight)

CaO: above 4% to 10% by weight (more preferably, 5% to 7% by weight)

The reason for this is that when the proportions of the formulation in the white opaque layer 14 are taken into consideration, even in a case in which the melting conditions or molding conditions for the glass composition have been slightly changed, a white glass container 10 which stably has a white multilayer structure 18 formed to include white crystals (calcium phosphate and the like) having an average particle size of 400 nm or less, the white multilayer structure being derived from a phase separation phenomenon of a composition for glass, and also has a reduced amount of foreign material having a predetermined particle size or larger generated on the outer surface side and the like, can be obtained.

Furthermore, for the same reasons as in the case of formulation A, it is preferable that the proportions of the formulation in the white opaque layer 14 attributed to formulation B are as follows with respect to the total amount (100% by weight).

$SiO_2$: 45% to 61% by weight (more preferably, 50% to 60% by weight)

$P_2O_5$: above 3% to 8% by weight (more preferably, 5% to 7% by weight)

$Al_2O_3$: 5% to 9% by weight (more preferably, 6% to 8.5% by weight)

$B_2O_3$: 1% to 13% by weight (more preferably, 1.5% to 5% by weight)

$R_2O$ (R=Na or K): 6% to 18% by weight (more preferably, 10% to 17% by weight)

MgO: 3% to 10% by weight (more preferably, 5% to 7% by weight)

CaO: above 4% to 10% by weight (more preferably, 5% to 7% by weight)

Furthermore, it is preferable to adjust the visible light transmittance of the white opaque layer 14 as such to a value of 2% or less.

The reason for this is that if such visible transmittance is above 2%, transparency may be increased, and white coloration as a white glass container may be markedly deteriorated.

However, if the visible light transmittance of the white opaque layer 14 is made excessively low, the type of glass components that can be used may be excessively limited, or the yield during production may be excessively decreased.

Therefore, it is more preferable to adjust the visible light transmittance of the white opaque layer 14 to a value within the range of 0.01% to 1.5%, and even more preferable to a value within the range of 0.1% to 0.8%.

3. White Glass Container

The fundamental form of the glass container is not particularly limited, and examples of the form include a bottleneck type glass bottle, a rectangular-shaped glass bottle, a cylindrical glass bottle, a heteromorphic glass bottle, a rectangular-shaped glass box, a cylindrical glass box, and a heteromorphic glass box.

Here, typical glass containers are rectangular-shaped white glass containers 10 and 10' illustrated in FIGS. 1(a) and 1(b).

More specifically, the glass containers are rectangular-shaped white glass containers 10 and 10', each provided with a rectangular pillar-shaped body portion (side walls and bottom) (B) having an approximately rectangular planar shape, and also with a cylindrical neck portion (A).

FIG. 1(a) illustrates a white glass container 10 having a body portion (side walls and a bottom) (B) having a three-layer structure 18, in which phase separation has occurred to a full extent, and FIG. 1(b) illustrates a white glass container 10' having a body portion (side walls and a bottom) (B) having a three-layered structure 18', in which phase separation has occurred to an almost full extent, but regions with incomplete phase separation are included in some parts.

Furthermore, the rectangular-shaped white glass containers 10 and 10' illustrated in FIGS. 1(a) and 1(b) have maximum wall thickness portions, for example, sites having a thickness (t) of 1 to 5 cm, between the side walls and the bottom, and since the sites exhibit superior white coloration, it can be said that the glass containers have a feel of high quality and superior aesthetic appearance.

Therefore, all of them have almost no difference in the external appearance as a basic form, and can be used as white glass containers 10 and 10' that are suitable for cosmetic cream containers having a feel of high quality or superior decorative properties without being separately provided with decorative layers.

Another typical example is bottleneck-shaped white glass containers 30 and 30' illustrated in FIGS. 2(a) and 2(b), each having a predetermined threaded portion 38 or 38' in the neck portion (A).

FIG. 2(a) shows a bottleneck-shaped white glass container 30 having a body portion (side walls and a bottom) (A) and a neck portion (B), both having a white two-layer structure 36 in which phase separation has occurred to a full extent.

Furthermore, the glass containers have a feature that the thickness of the white opaque layer 32 formed in the body portion (side walls and a bottom) varies significantly at the upper part and the lower part, and in overall, the body portion exhibits white coloration with a gradation pattern.

More specifically, there is provided a white glass container 30 having a body portion (B) having a two-layer structure 36 with different thicknesses, in which a relatively thick white opaque layer 32 that exhibits intense white coloration is formed in the inner lower region of the white glass container 30, and a relatively thin white opaque layer 32 that exhibits intense white coloration is formed in the inner upper region at the backside (inner side) of the white opaque layer 32 having a uniform thickness.

On the other hand, FIG. 2(b) is a bottleneck-shaped white glass container 30' having a body portion (side walls and a bottom) (A) and a neck portion (B), both having a white three-layer structure 36'.

That is, such a white glass container 30' is provided on the outermost surface of the container with a white transparent layer (first white transparent layer) 34' having a thickness of a thin film, is further provided with a white opaque layer 32' having a predetermined thickness with intense white coloration, and includes a white transparent layer (second white transparent layer) 33' having a thickness of a thin film on the inner surface.

Such a white glass container 30' is also characterized in that the thickness of the white opaque layer 32 varies significantly in the upper part and the lower part, and the white glass container exhibits in overall a predetermined pattern having a difference in density in relation to white coloration.

Nevertheless, the white glass containers 30 and 30' shown in FIGS. 2(a) and 2(b) can be suitably used directly as lotion containers and the like having a feel of high quality or superior decorativeness, without separately providing a decorative layer.

Second Embodiment

According to a second embodiment, there is provided a method for producing a white glass container having at least a neck portion and a body portion and derived from a phase separation phenomenon of a glass composition, the white glass container containing, as ingredients, at least $SiO_2$, $P_2O_5$, $Al_2O_3$, $B_2O_3$, $R_2O$ (R=Na or K), ZnO and CaO, or at least $SiO_2$, $P_2O_5$, $Al_2O_3$, $B_2O_3$, $R_2O$ (R=Na or K), MgO and CaO, in which method the body portion has, in a portion or in the entirety, a white multilayer structure (three-layer structure) configured to successively include, from the outer surface side toward the inner surface side, a white transparent layer of relatively low white coloration, and a white opaque layer of relatively high white coloration; the content of $P_2O_5$ in the white transparent layer is smaller than the content of $P_2O_5$ in the white opaque layer; and the method includes the following Step 1 and Step 2:

Step 1: a step of preparing a composition for glass including, as ingredients, at least $SiO_2$, $P_2O_5$, $Al_2O_3$, $B_2O_3$, $R_2O$ (R=Na or K), ZnO and CaO, or at least $SiO_2$, $P_2O_5$, $Al_2O_3$, $B_2O_3$, $R_2O$ (R=Na or K), MgO and CaO, and melting the composition; and Step 2: a step of molding the molten composition for glass by a one-press method using a mold and a plunger, and slowly cooling the composition, so as to obtain a white glass container having a three-layer structure derived from a phase separation phenomenon of the glass composition, in a portion or the entirety of the neck portion and the body portion.

In the following description, the method for producing a white glass container having a three-layer structure of the second embodiment will be specifically explained with appropriate reference to FIGS. 5(a) to 5(c) and FIGS. 6(a) to 6(d).

1. Step 1

Step 1 is a step of preparing a composition for glass having a composition for glass having a predetermined glass formulation, that is, a composition for glass having the glass formulation explained in Embodiment 1, and melting the composition.

On the occasion of preparing the composition for glass, the form of an alkali metal oxide or an alkaline earth metal oxide as a glass raw material is suitably a carbonate compound, and the raw material for $P_2O_5$ is suitably dibasic calcium phosphate ($CaHPO_4$), calcium metaphosphate ($Ca(PO_3)_2$), sodium tripolyphosphate ($Na_5P_3O_{10}$), dibasic sodium phosphate ($NaHPO_4$), and bone meal.

Figure 3:
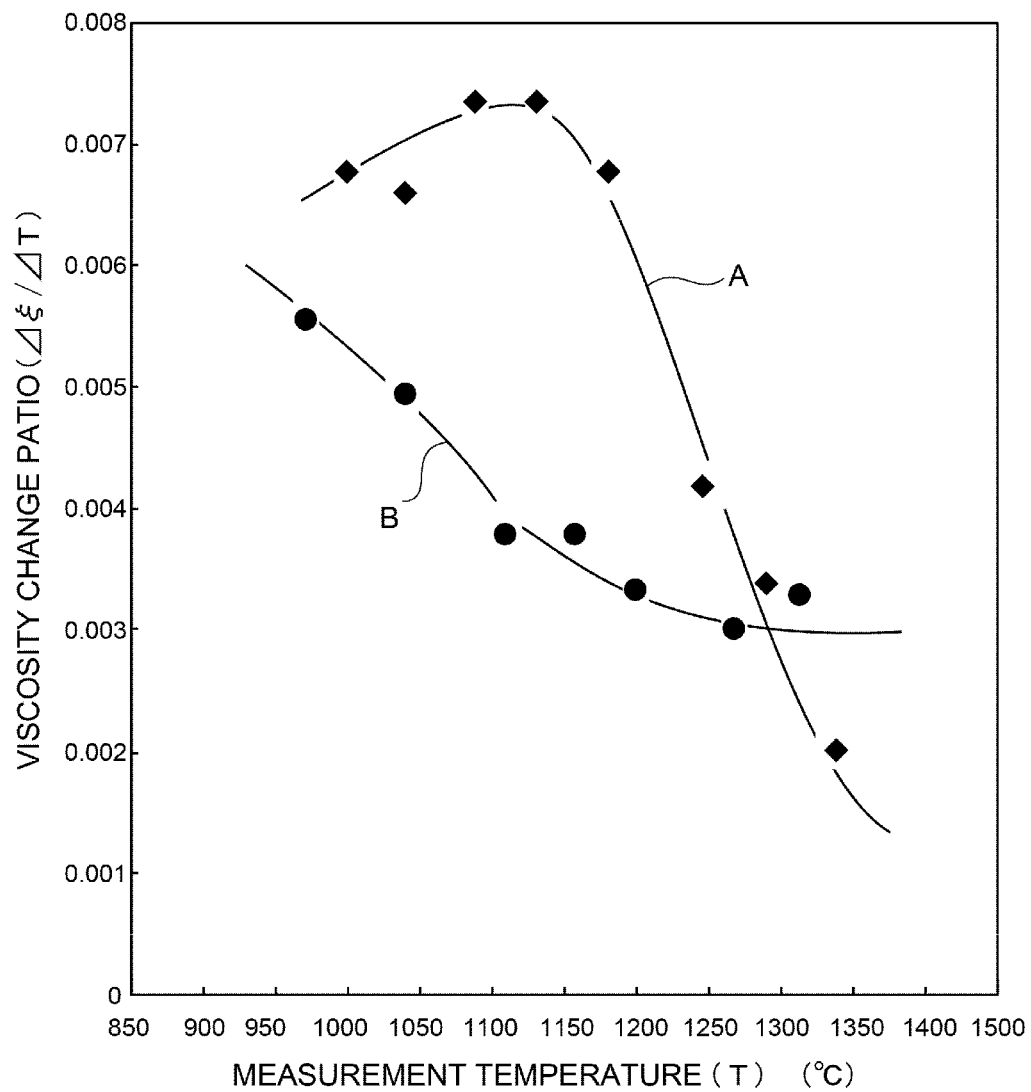
FIG. 3 is a diagram provided to explain the relation between the measurement temperature and the viscosity change ratio of molten glass.

FIG. 3 illustrates the relation between temperature (melting temperature) and the viscosity change ratio (viscosity change/temperature change) in a composition for glass in a molten state.

Line A is a characteristic curve for the viscosity change ratio in a composition for glass according to Example 1 that will be described below, and line B is a characteristic curve for the viscosity change ratio in a general soda glass composition.

As is understood from the characteristic curve of line A as such, when the temperature is within the range of 950° C. to 1150° C., the value of the viscosity change ratio increases as temperature increases; however, when the temperature exceeds 1150° C. and rises up to 1350° C., there is observed a tendency that the value of the viscosity change ratio drops rapidly as temperature increases.

Therefore, in the case of a composition for glass according to Example 1 or the like, although the temperature dependency of the viscosity change ratio is relatively large, the value of the viscosity change ratio is relatively small and has a value of 0.004 or less. Therefore, it can be said that it is preferable to set the measurement temperature (melting temperature) to be 1250° C. or more, and more preferably to be within a relatively high temperature range of 1300° C. to 1400° C.

Meanwhile, in a comparison with the characteristic curve of the viscosity change ratio for a soda glass composition represented by line B, in the case of the composition for glass represented by line A according to Example 1 or the like, when the measurement temperature is maintained at a relatively high temperature, for example, 1300° C., a value of the viscosity change ratio that is far lower than the value of the soda glass composition can be obtained.

Furthermore, in regard to the melting furnace in which Step 1 is carried out, it is preferable that a predetermined bubbling treatment is carried out, and the composition for glass is melted and stirred.

Figure 4A:
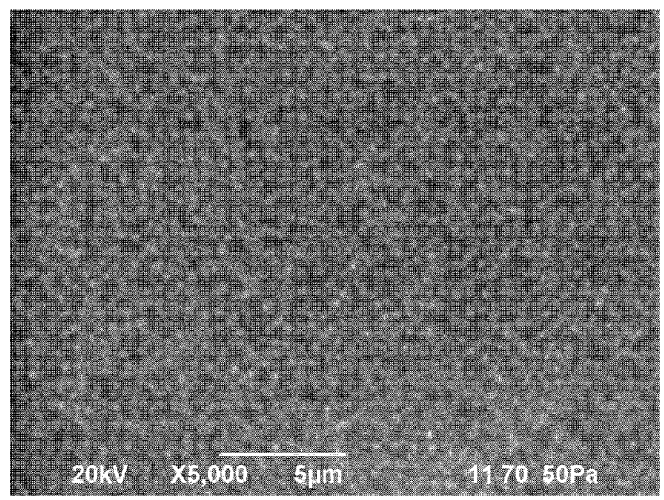
FIG. 4(*a*) is a photograph provided to explain the generation of white crystals having a uniform and fine average particle size (for example, 200 nm to 300 nm) in a white opaque layer, and FIGS. 4(*b*) and 4(*c*) are photographs provided to explain the foreign material derived from phosphate crystals having an average particle size of 3 μm or more, and the surface state of a white glass container, respectively.

The reason for this is that when a gas such as air or nitrogen is blown into molten glass, that is, a bubbling treatment is carried out, various glass components, particularly $P_2O_5$ and CaO, can be uniformly mixed and melted. Therefore, as illustrated in FIG. 4(a), phosphate crystals having a uniform and fine average particle size (for example, 200 nm to 300 nm) can be obtained.

Figure 4B:
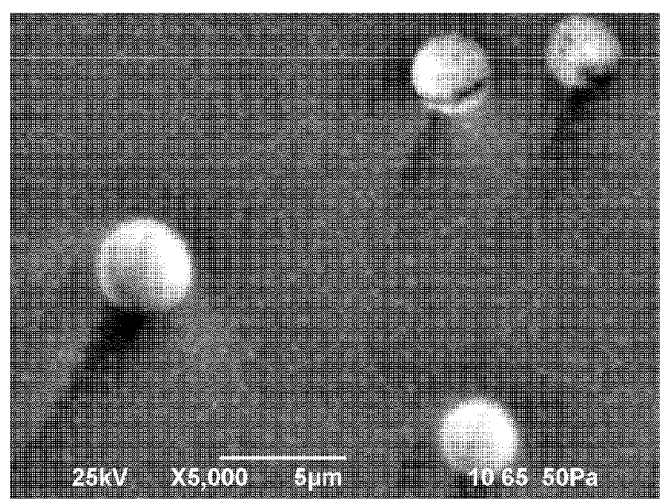
Figure 4C:
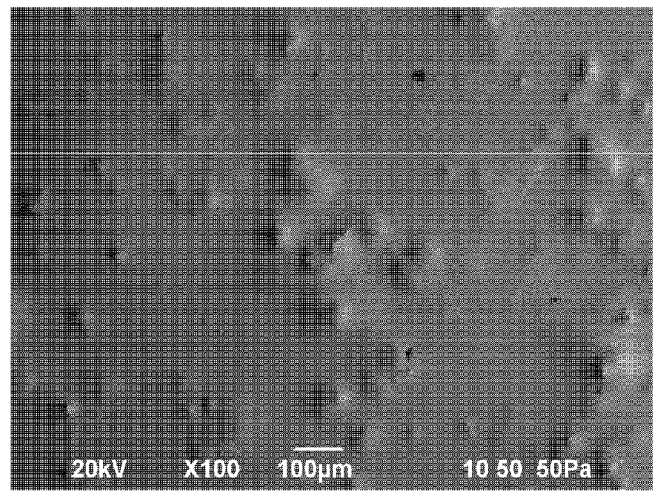

In other words, it is because if $P_2O_5$ and CaO are not uniformly mixed and melted due to fluctuations in the production conditions and the like, a foreign material derived from phosphate crystals having an average particle size of 3 μm or more as shown in FIG. 4(b) is generated, and furthermore, causes surface roughness on the glass container surface as shown in FIG. 4(c).

2. Step 2

Furthermore, Step 2 is a step of producing a white glass container which has a predetermined shape and has a white multilayer structure in a portion or in the entirety, from the molten composition for glass by a so-called one-press method.

That is, when a white glass container is produced by a one-press method as such, even in a case in which a significant amount of fluorine compounds are not included, a white glass container having a white multilayer structure (three-layer structure) including a phase separation region in a portion or in the entirety can be efficiently obtained using a predetermined mold or the like, irrespective of the melting conditions or molding conditions for the glass composition.

More specifically, a white glass container having a finished shape is molded using a mold for one-press method and a plunger, and then the white glass container is slowly cooled directly inside the mold for one-press method, or as an invert in a cooling mold.

At that time, since the glass surface that is brought into contact directly with the inner surface of the mold for one-press method, and the glass surface that is brought into contact directly with the plunger are respectively rapidly cooled through heat transfer, the phase separation phenomenon occurs to a less extent, and white transparent layers of relatively low white coloration (first white transparent layer and second white transparent layer) are formed.

On the other hand, in regard to the molten glass that is not brought into contact directly with the inner surface of the mold for one-press method and the plunger, since this portion is not cooled as rapidly as the above-mentioned case, the phase separation phenomenon occurs to a larger extent, and a white opaque layer of relatively high white coloration is formed.

Even more specifically, as illustrated in FIGS. 5(a) to 5(c) and FIGS. 6(a) to 6(d), it is preferable that a white glass container 10 is produced from glass gob 8, which is a predetermined molten product of a glass composition, by a one-press method.

Figure 5A:
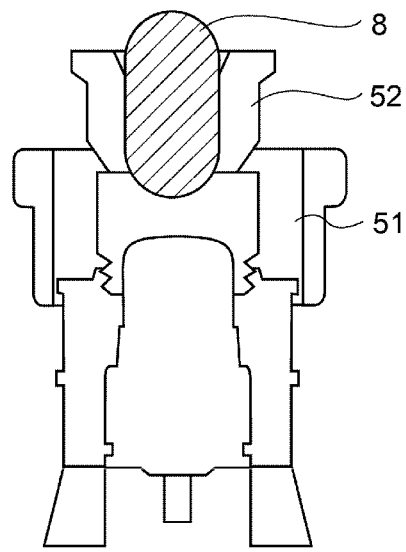
FIGS. 5(*a*) to 5(*c*) are diagrams provided to explain the methods for producing a white glass container according to a one-press method (first of them).

First, as illustrated in FIG. 5(a), a molding die 51 is installed, and glass gob 8 is introduced into the relevant molding die 51 through a funnel 52.

Figure 5B:
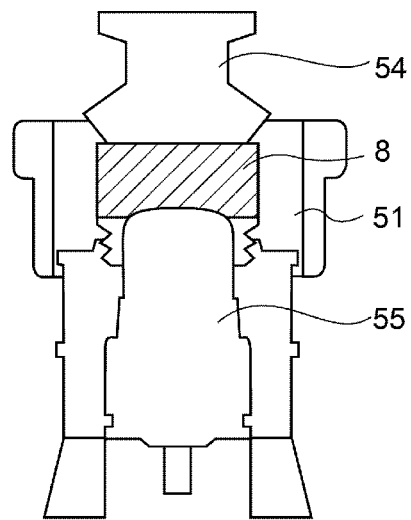
Figure 5C:
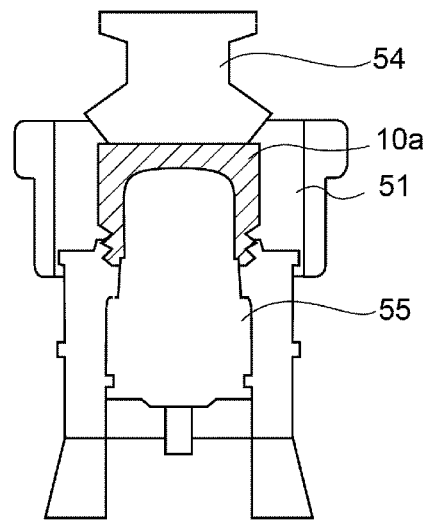

Next, as illustrated in FIGS. 5(b) and 5(c), a baffle 54 is mounted instead of the funnel 52, and then a plunger 55 is inserted against the molding die 51 filled with the glass gob 8. Then, this state is maintained until the surface of the glass container 10a having a finished shape is cooled to an extent that a certain shape is retained.

That is, a glass container 10a having a desired finished shape is formed through such a molding process.

Figure 6A:
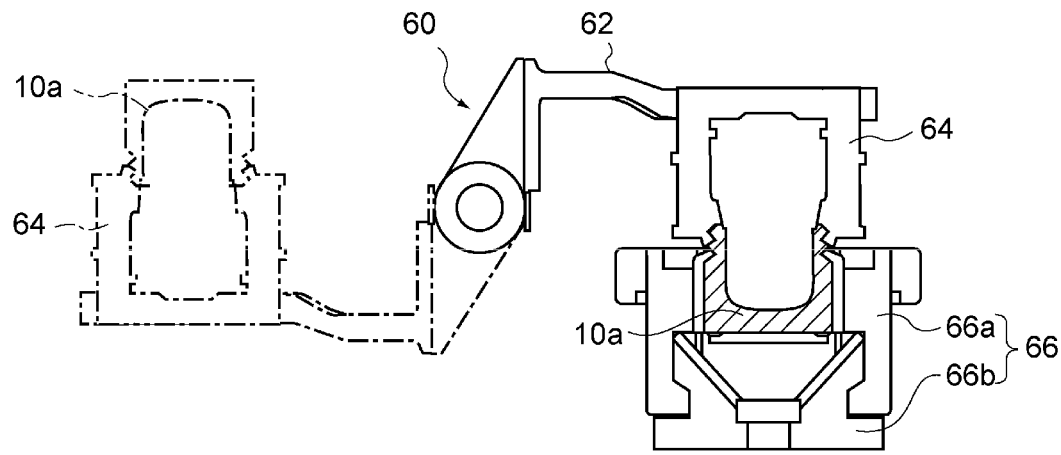
FIGS. 6(*a*) to 6(*d*) are diagrams provided to explain the methods for producing a white glass container according to a one-press method (second of them).

Next, as illustrated in FIG. 6(a), the molding die 51 and the plunger 55 are pulled out, and then the glass container 10a having a finished shape, that is, a final shape, is moved to rotate 180° (inverted) by a rotating apparatus 60 equipped with an arm 62 and is accommodated in a cooling mold 66 (66a and 66b).

Therefore, the glass container 10a having a finished shape is moved to rotate in a state in which the mouth of the container is supported by a neck ring 64 that is a part of the molding die 51 and is connected to the arm 62. Also, the glass container 10a is accommodated and retained in the cooling mold 66 such that a gap is provided between the outer peripheral surface of the glass container 10a having a finished shape, and the cooling mold 66.

At this time, the glass container 10a having a finished shape that has been transferred to the cooling mold 66 is supported at the mouth part by a supporting unit in the cooling mold 66, and also, the bottom is mounted on a bottom mold 66b as a mounting unit.

Figure 6B:
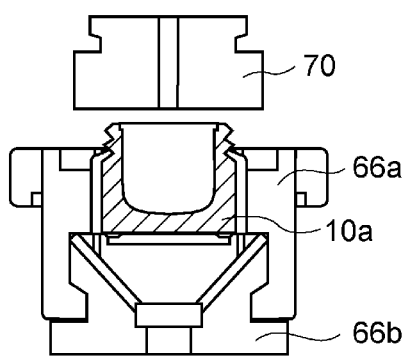

Next, as illustrated in FIG. 6(b), a blow head 70 is disposed in the upper part of the cooling mold 66. At this time, the blow head 70 is disposed to be separated apart from the supporting unit that supports the mouth part of the glass container 10a having a finished shape.

Figure 6C:
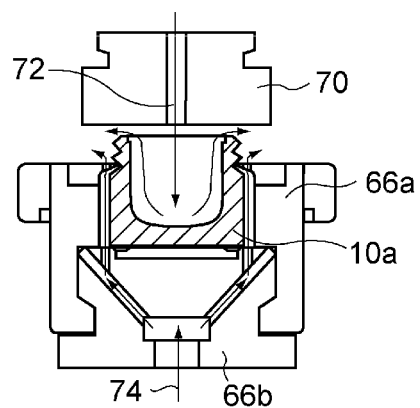

Next, as illustrated in FIG. 6(c), in the inside of the glass container 10a having a finished shape, predetermined cooling air 72 is blown thereinto through the blow head 70 disposed in the upper part of the cooling mold 66.

Simultaneously, other cooling air 74 is blown into the gap provided between the outer peripheral surface of the glass container 10a having a finished shape and the cooling mold 66, from the lower part side, without directly blowing the cooling air to the glass container 10a having a finished shape.

Figure 6D:
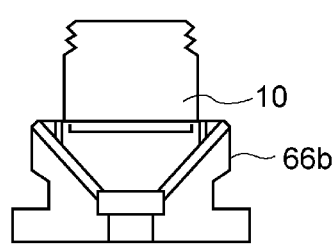

Thereby, the glass container 10a having a finished shape can be efficiently cooled through the outer peripheral surface and the inner side surface, and as illustrated in FIG. 6(d), the white glass container 10 as a final product can be finished.

3. Step 3

Step 3 is a flame polishing treatment step (fire polish treatment step), which is a subsequent step of Step 2 and is an optional step.

Figure 7:
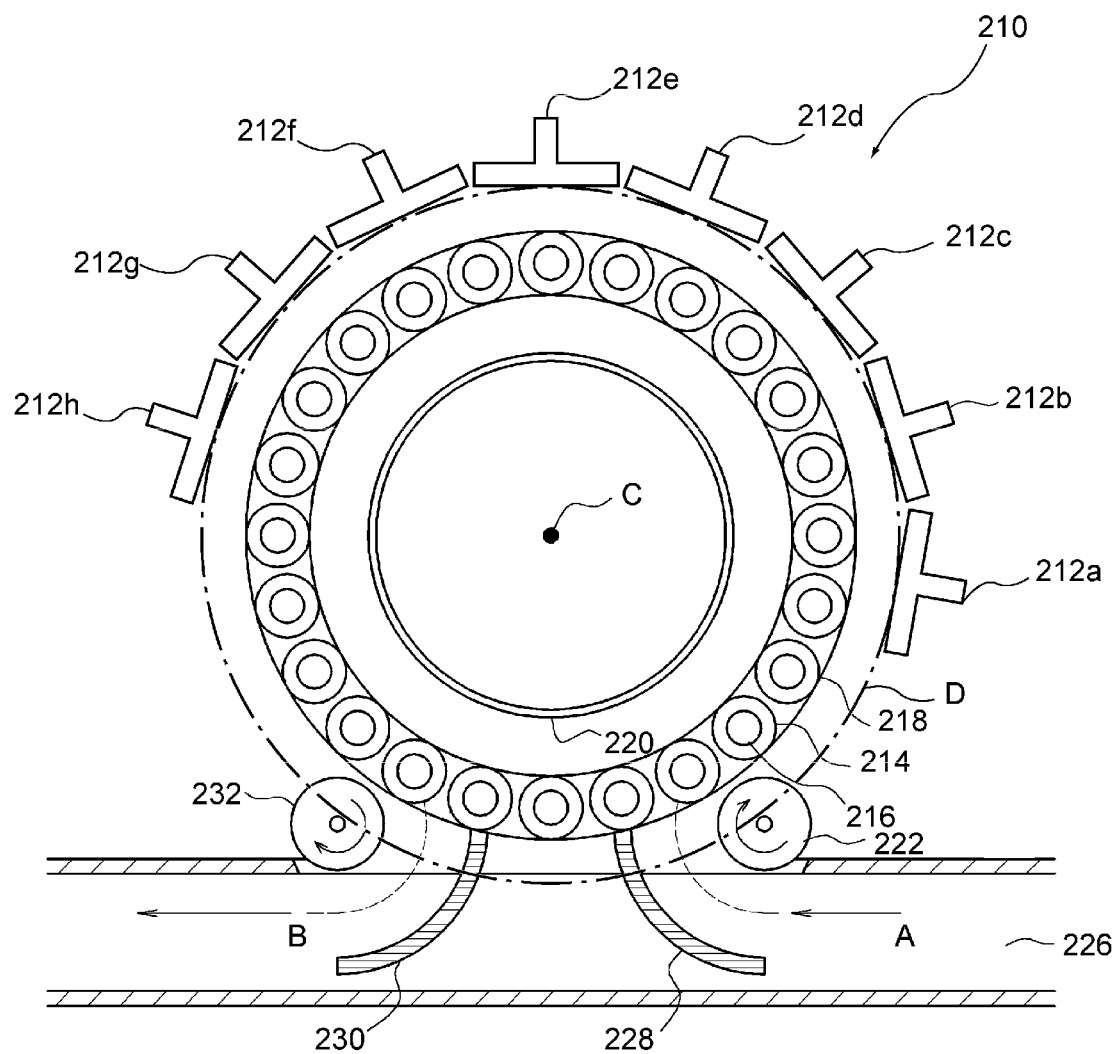
FIG. 7 is a diagram provided to explain a flame polishing apparatus.

That is, it is preferable that the surface of the white glass container obtained in Step 2 is subjected to a flame polishing treatment using the flame polishing treatment apparatus 210 illustrated in FIG. 7.

More specifically, it is preferable to use a flame polishing apparatus 210 for glass containers, which includes supports for glass containers 214; multiple flame throwers 212 (212a to 212h); a driving unit 218 for moving the supports for glass containers 214 equipped with fixing units 216, along an arc-shaped path around a circular reflecting thermal insulation member 220; and rotating motors 222 and 232, and in which multiple flame throwers 212 (212a to 212h) are radially disposed along an imaginary movement curve D along which the supports for glass containers 214 move.

The reason for this is that when a flame polishing treatment is carried out using such a flame polishing apparatus for glass containers, the surface state of the white glass containers becomes smooth, and white glass containers exhibiting satisfactory white coloration can be efficiently obtained.

In the case of the flame polishing treatment apparatus 210 illustrated in FIG. 7, in order to enable a continuous flame polishing treatment, a curved arm-shaped carry-in apparatus 228 that bring in white glass containers in the direction of arrow A, and a belt conveyor 226 and a carry-out apparatus 230 for transporting the flame polish-treated white glass containers in the direction of arrow B are provided adjacently to the flame polishing treatment apparatus 210.

In addition to that, although not shown in the diagram, it is also preferable to provide plural flame throwers on one side or on both sides of the linearly shaped belt conveyor, so that white glass containers to be treated are mounted on the belt conveyor without being rotated, and the flame polishing treatment step (fire polish treatment step) is implemented on the surface of the white glass bottles in the middle of moving.

Third Embodiment

According to a third embodiment, there is provided a method for producing a white glass container having at least a neck portion and a body portion and derived from a phase separation phenomenon of a glass composition, the white glass container including, as ingredients, at least $SiO_2$, $P_2O_5$, $Al_2O_3$, $B_2O_3$, $R_2O$ (R=Na or K), ZnO and CaO, or at least $SiO_2$, $P_2O_5$, $Al_2O_3$, $B_2O_3$, $R_2O$ (R=Na or K), MgO and CaO, in which method the body portion has, in a portion or in the entirety, a white multilayer structure (two-layer structure) configured to successively include a white transparent layer of relatively low white coloration and a white opaque layer of relatively high white coloration from the outer surface side toward the inner surface side; the content of $P_2O_5$ in the white transparent layer is smaller than the content of $P_2O_5$ in the white opaque layer; and the method includes the following Step 1' and Step 2':

Step 1': a step of preparing a composition for glass including, as ingredients, at least $SiO_2$, $P_2O_5$, $Al_2O_3$, $B_2O_3$, $R_2O$ (R=Na or K), ZnO and CaO, or at least $SiO_2$, $P_2O_5$, $Al_2O_3$, $B_2O_3$, $R_2O$ (R=Na or K), MgO and CaO, and melting the composition for glass; and Step 2': a step of molding the molten composition for glass by a blow method using a mold and cooling air, and also slowly cooling the composition for glass, so as to obtain a white glass container having, in a portion or the entirety of the neck portion and the body portion, a two-layer structure derived from a phase separation phenomenon of the glass composition.

In the following description, the method for producing a white glass container having a two-layer structure of the third embodiment will be specifically explained with appropriate reference to FIGS. 8(a) to 8(d).

1. Step 1'

Step 1' is similar to the step of preparing and melting the composition for glass explained in connection with the first embodiment, the composition for glass having a predetermined glass formulation. Therefore, further explanation will not be repeated here.

2. Step 2'

Step 2' is a step of producing a white glass container with a predetermined shape having, in a portion or in the entirety, a white multilayer structure derived from a phase separation phenomenon of a composition for glass, from the molten composition for glass by a so-called blow method (including a blow/blow method and a press/blow method).

That is, when a white glass container is produced by a blow method as such, in a case in which the formulation does not include a significant amount of fluorine compounds, a white glass container having, in a portion or in the entirety, a white multilayer structure (a two-layer structure or a three-layer structure) formed to include a phase separation region can be efficiently obtained using a predetermined mold or the like, irrespective of the melting conditions or molding conditions for the glass composition.

According to a press/blow method, to explain more specifically, a parison is molded as an intermediate form of a white glass container using a mold for parison molding (rough mold) and settle blow, and then a white glass container having a finished shape is molded using a mold for blow molding and cooling air. Subsequently, the white glass container is slowly cooled directly in the mold for blow molding, or as an invert or the like in a cooling mold.

At that time, since the glass surface that is brought into direct contact with the inner surface of the mold for blow molding is rapidly cooled through heat transfer, the phase separation phenomenon occurs to a small extent, and a white transparent layer of relatively low white coloration is formed.

On the other hand, the glass surface that is not brought into direct contact with the inner surface of the mold for blow molding is brought into direct contact with cooling air, but is not cooled as rapidly as in the above-mentioned case. Therefore, the phase separation phenomenon occurs to a large extent, and a white opaque layer of relatively high white coloration is formed.

More specifically, as illustrated in FIGS. 8(a) to 8(d), it is preferable to produce the white glass container 30 by a blow method (blow/blow method).

Figure 8A:
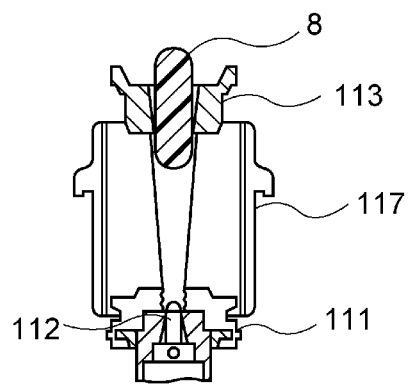
FIGS. 8(*a*) to 8(*d*) are diagrams provided to explain the method for producing a white glass container according to a blow method (blow/blow method).
Figure 8B:
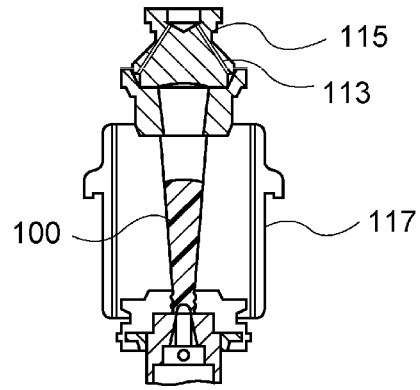

First, on the occasion of performing primary molding, as illustrated in FIG. 8(a), a rough mold 11 is installed, and glass gob 8 is introduced into the rough mold through a funnel 113. Subsequently, as illustrated in FIG. 8(b), a baffle 111 is inserted, settling air is blown from above from a settle blow apparatus 115, and the glass gob 8 is pressed at the lower part.

Figure 8C:
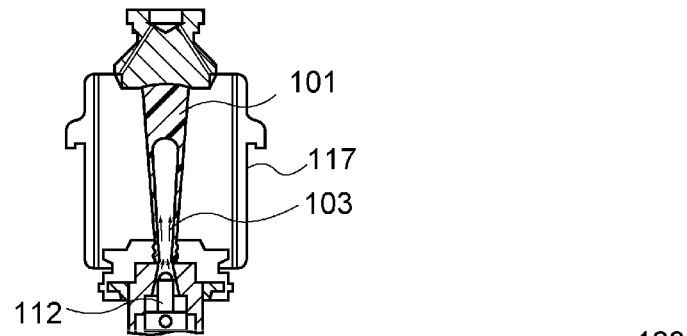

Next, as illustrated in FIG. 8(c), air for counterblow 103 is blow from below from the tip of a plunger 112 in the rough mold 117, and a parison 101 is formed.

Figure 8D:
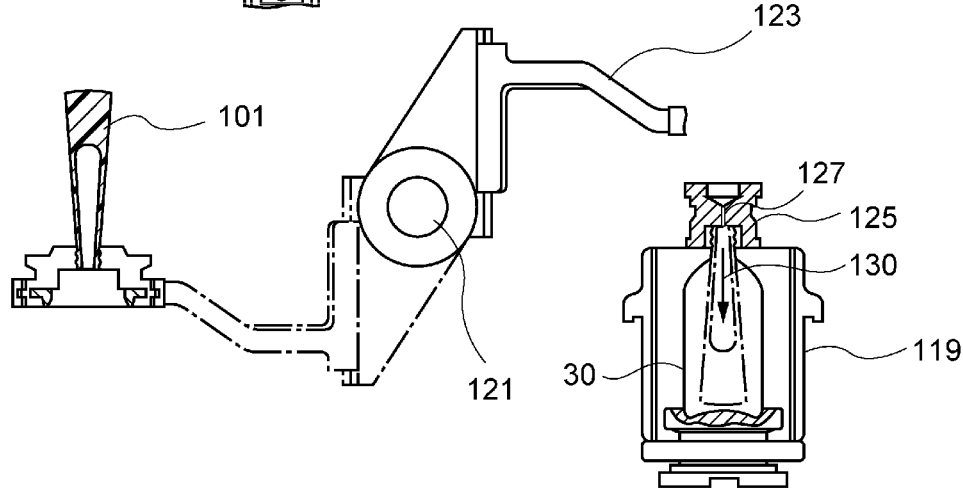

Next, secondary molding is performed. That is, as illustrated in FIG. 8(d), the parison 101 thus obtained is moved to rotate 180° by means of a rotating apparatus 121 equipped with an arm 123, and the parison is accommodated at a predetermined site in a finish mold 119.

Then, air for final blow 130 is blown into the interior of the parison 101 from an air supply outlet for final blow 127 provided at the neck ring 125, and thereby the parison can be molded into a desired shape and can be taken out as a white glass container 30.

3. Step 3'

Step 3' is a step of applying a flame polishing treatment to the surface of the white glass container, and since Step 3' is similar to Step 3 of the second embodiment, further explanation will not be repeated here.

EXAMPLES

Hereinafter, the present invention will be explained in detail by way of Examples.

Example 1

1. Production of White Glass Container

First, as one of formulation A, a glass raw material was prepared so as to obtain the following glass formulation (indicated as Formulation 1 in Table 1), and then the glass raw material was mixed in a dry state for one hour using a mixing machine. Thus, 100 kg in total of a glass raw material was obtained.

$SiO_2$: 61.1% by weight
$P_2O_5$: 4.8% by weight
CaO: 4.8% by weight
$Al_2O_3$: 6.5% by weight
$B_2O_3$: 6.9% by weight
$Na_2O$: 9.0% by weight
$K_2O$: 2.3% by weight
ZnO: 4.6% by weight Next, the uniformly mixed glass raw material was accommodated in a magnetic container and then was melted using an air atmosphere type resistance heating electric furnace under the conditions of 2 hours at a melting temperature of 1300° C. or more.

That is, in the middle of melting, the molten glass was stirred several times using a platinum spatula, and also, air was blown through multiple holes provided at the bottom of the magnetic container to perform a bubbling treatment for about 2 minutes. Thus, uniform mixing of the glass formulation was sufficiently promoted.

Next, after it was confirmed that the glass components had completely melted and become clear, the molten glass thus obtained was inserted into the interior of a mold for one-press method, and also, a plunger was inserted. Thereby, a rectangular-shaped glass container having a shape similar to the finish shape was obtained.

At that time, multiple cooling air streams, that is, a first cooling air stream for cooling the glass container itself (wet air, temperature: 40° C., water vapor content: 80 g/m$^3$) and a second cooling air stream for cooling the outer surface of the mold (non-wet air, temperature: 40° C.), were respectively used as mold cooling air, and the jet velocity was respectively set to 10 liters/second.

Finally, the resultant was slowly cooled, and then a white glass container including a neck portion having a cylindrical diameter and a body portion having a rectangular shape as illustrated in FIG. 1(a) was taken out.

At this time point, the formulations of $P_2O_5$ and CaO in the white transparent layer formed at the surface of the body portion of the white glass container and the white opaque layer formed in the interior of the body portion of the white glass container were analyzed using a wavelength dispersive fluorescent X-ray spectrometer (manufactured by Rigaku Co., Ltd., SUPERMINI200) in the EZ scan mode.

As a result, the proportions of the formulation in the white transparent layer were as follows.

$SiO_2$: 62.0% by weight
$P_2O_5$: 2.2% by weight
CaO: 2.5% by weight
$Al_2O_3$: 10.5% by weight
$B_2O_3$: 6.5% by weight
$Na_2O$: 10.7% by weight
$K_2O$: 1.9% by weight
ZnO: 3.7% by weight Furthermore, the white glass surface was polished to expose the white opaque layer, and the proportions of the formulation in that state were as follows.

$SiO_2$: 56.8% by weight
$P_2O_5$: 6.3% by weight
CaO: 4.6% by weight
$Al_2O_3$: 6.8% by weight
$B_2O_3$: 8.8% by weight
$Na_2O$: 10.7% by weight
$K_2O$: 2.2% by weight
ZnO: 3.8% by weight That is, it was confirmed that the contents of $P_2O_5$ and CaO in the white transparent layer were respectively smaller than the contents of $P_2O_5$ and CaO in the white opaque layer.

2. Evaluation of White Glass Container (1) Extent of Formation of White Multilayer Structure in Body Portion (Evaluation 1)

The body portion in a white glass container thus obtained was cut with a diamond cutter in a vertical direction, and from an optical photograph (magnification ratio 1) of a cross-section thereof, the extent of formation of a white multilayer structure (three-layer structure) in the body portion was determined according to the following criteria.

⊙ (very good): A white multilayer structure (three-layer structure) was definitely formed.

○ (good): A white multilayer structure (three-layer structure) was formed almost definitely.

Δ (fair): A white multilayer structure (three-layer structure) was not formed in some part.

X (bad): A white multilayer structure (three-layer structure) was not formed at all.

(2) Extent of Formation of White Multilayer Structure in Neck Portion (Evaluation 2)

The neck portion in a white glass container thus obtained was cut with a diamond cutter in a vertical direction, and from an optical photograph (magnification ratio 1) of a cross-section thereof, the extent of formation of a white multilayer structure (three-layer structure) in the neck portion was determined according to the following criteria.

⊙ (very good): A white multilayer structure (three-layer structure) was definitely formed.

○ (good): A white multilayer structure (three-layer structure) was formed almost definitely.

Δ (fair): A white multilayer structure (three-layer structure) was not formed in some part.

X (bad): A white multilayer structure (three-layer structure) was not formed at all.

(3) Whiteness of Body Portion (Evaluation 3)

A portion of the body portion of a white glass container thus obtained was cut with a diamond cutter, and the degree of whiteness (L) was measured according to JIS Z 8730 using a spectroscopic colorimeter (model No. SP62, manufactured by X-Rite, Inc.). Whiteness was evaluated from the values of the degree of whiteness thus obtained, according to the following criteria.

⊙ (very good): The degree of whiteness (L) is 80 or more.

○ (good): The degree of whiteness (L) is 70 or more and below 80.

Δ (fair): The degree of whiteness (L) is 50 or more and below 70.

X (bad): The degree of whiteness (L) is below 50.

(4) Whiteness of Neck Portion (Evaluation 4)

A portion of the neck portion of a white glass container thus obtained was cut with a diamond cutter, and the degree of whiteness (L) was measured according to JIS Z 8730 using a spectroscopic colorimeter (model No. SP62, manufactured by X-Rite, Inc.). Whiteness in the neck portion was evaluated from the values of the degree of whiteness thus obtained, according to the following criteria.

In addition, it has been conventionally considered that since the neck portion is provided with a threaded part and is required to have a predetermined mechanical strength or mechanical dimension, even though whiteness is decreased to a certain extent, it is desirable to have a relatively lower degree of phase separation in the neck portion for practical use.

However, since a metal protective cap or the like is provided at the neck portion, it is preferable that the neck portion is also provided with the same white multilayer structure as that of the body portion. On the other hand, when the value of the degree of whiteness (L) is higher than or equal to a certain level, it can be said that the white coloration is sufficient for a threaded part.

⊙ (very good): The degree of whiteness (L) is 40 or more.

○ (good): The degree of whiteness (L) is 30 or more and below 40.

Δ (fair): The degree of whiteness (L) is 20 or more and below 30.

X (bad): The degree of whiteness (L) is below 20.

(5) Appearance Characteristics (Evaluation 5)

The appearance shape or surface state of a white glass container thus obtained was visually observed, and the appearance characteristics were evaluated according to the following criteria.

⊙ (very good): There is no particular problem in the appearance shape, and foreign materials are not at all observed at the surface.

○ (good): There is no particular problem in the appearance shape, and foreign materials are hardly observed at the surface.

Δ (fair): There is no particular problem in the appearance shape; however, some foreign materials are observed at the surface.

X (bad): The appearance shape is partially destroyed, and a number of foreign materials are observed at the surface.

(6) Mechanical Strength (Evaluation 6)

White glass containers (10 containers) thus obtained were subjected to free fall from a height of 1 m onto a P-tiled concrete surface, and the fracture modes were observed. Thus, the mechanical strength was evaluated according to the following criteria.

⊙ (very good): The number of fractures is 0.

○ (good): The number of fractures is 1.

Δ (fair): The number of fractures is 2 or 3.

X (bad): The number of fractures is 4 or more.

(7) Thermal Shock Properties (Evaluation 7)

White glass containers (10 containers) thus obtained were immersed in a high temperature water tank that had been maintained at 67° C. and were left to stand therein for 30 minutes. Next, the white glass containers were taken out from the high temperature water tank, and the containers were immersed in a low temperature water tank that had been maintained at 25° C. and were left to stand therein for 15 minutes.

Subsequently, the white glass containers were taken out from the low temperature water tank, and the external appearance was observed. Thus, thermal shock properties were evaluated according to the following criteria.

⊙ (very good): The number of white glass containers in which cracking or crazing had occurred is 0.

○ (good): The number of white glass containers in which cracking or crazing had occurred is 1.

Δ (fair): The number of white glass containers in which cracking or crazing had occurred is 2 or 3.

X (bad): The number of white glass containers in which cracking or crazing had occurred is 4 or more.

Example 2

In Example 2, a white glass container was produced by a one-press method in the same manner as in Example 1, except that as one of formulation A, a glass raw material was prepared so as to obtain the following glass formulation (indicated as Formulation 2 in Table 1), and further investigations were conducted on the effect of adding $Li_2O$ as an ingredient of the glass composition and the effect of adding $CeO_2$ as an oxidizing agent, and the white glass containers were evaluated.

Furthermore, in Example 2, the concentration of Fe included in the white glass container was adjusted to be relatively lower (about 180 ppm), using various low-iron glass raw materials.

At this time point, similarly to Example 1, the proportions of formulation of $P_2O_5$, CaO and the like in the formulation of the white glass container (assumed to be molten glass), the same proportions in the white transparent layer formed at the surface of the body portion, and the same proportions in the white opaque layer, were analyzed using wavelength dispersive fluorescent X-ray spectrometry in the EZ scan mode.

That is, it was confirmed that the contents of $P_2O_5$ and CaO in the white transparent layer were respectively smaller than the contents of $P_2O_5$ and CaO in the white opaque layer.

In addition, a single assumed formulation calculated from the formulation of raw materials used when the white glass container was produced, is also described together.

(Assumed Blending Ratio)
$SiO_2$: 57.1% by weight
$P_2O_5$: 4.4% by weight
CaO: 6.0% by weight
$Al_2O_3$: 7.1% by weight
$B_2O_3$: 7.3% by weight
$Na_2O$: 9.5% by weight
$K_2O$: 2.0% by weight
ZnO: 4.3% by weight
$Li_2O$: 1.8% by weight
$CeO_2$: 0.5% by weight
(White Transparent Layer)
$SiO_2$: 58.1% by weight
$P_2O_5$: 2.4% by weight
CaO: 2.8% by weight
$Al_2O_3$: 9.3% by weight
$B_2O_3$: 8.8% by weight
$Na_2O$: 10.4% by weight
$K_2O$: 2.0% by weight
ZnO: 3.7% by weight
$Li_2O$: 2.0% by weight
$CeO_2$: 0.5% by weight
(White Opaque Layer)
$SiO_2$: 54.6% by weight
$P_2O_5$: 4.8% by weight
CaO: 4.6% by weight
$Al_2O_3$: 7.4% by weight
$B_2O_3$: 9.6% by weight
$Na_2O$: 10.5% by weight
$K_2O$: 2.0% by weight
ZnO: 3.8% by weight
$Li_2O$: 2.0% by weight
$CeO_2$: 0.7% by weight Example 3

In Example 3, a white glass container was produced by a one-press method in the same manner as in Example 1, except that as one of formulation A, a glass raw material was prepared so as to obtain the following glass formulation (indicated as Formulation 3 in Table 1), and further investigations were conducted on the effect of adding $Li_2O$ as a glass component, the influence of the blending amount of $CeO_2$ as an oxidizing agent, the influence of the blending amount of $Er_2O_3$ as an achromatizing agent, and the like. The extent of phase separation and the like were evaluated.

Furthermore, also in Example 3, the concentration of Fe included in the white glass container was adjusted to be relatively lower (about 180 ppm) using various low-iron glass raw materials.

At this time point, similarly to Example 1, the proportions of formulation of $P_2O_5$, CaO and the like in the white transparent layer formed at the surface of the body portion of the white glass container, and the same proportions in the white opaque layer were analyzed using wavelength dispersive fluorescent X-ray spectrometry in the EZ scan mode.

That is, it was confirmed that the contents of $P_2O_5$ and CaO in the white transparent layer were respectively smaller than the contents of $P_2O_5$ and CaO in the white opaque layer.

In addition, a single assumed formulation calculated from the formulation of raw materials used when the white glass container was produced, is also described together.

(Assumed Formulation)
$SiO_2$: 58.2% by weight
$P_2O_5$: 4.5% by weight
CaO: 4.2% by weight
$Al_2O_3$: 7.1% by weight
$B_2O_3$: 7.5% by weight
$Na_2O$: 9.6% by weight
$K_2O$: 2.0% by weight
ZnO: 4.4% by weight
$Li_2O$: 1.9% by weight
$CeO_2$: 0.55% by weight
$Er_2O_3$: 0.05% by weight
(Formulation of White Transparent Layer)
$SiO_2$: 58.1% by weight
$P_2O_5$: 2.9% by weight
CaO: 3.8% by weight
$Al_2O_3$: 8.8% by weight
$B_2O_3$: 7.8% by weight
$Na_2O$: 10.2% by weight
$K_2O$: 2.0% by weight
ZnO: 3.8% by weight
$Li_2O$: 2.0% by weight
$CeO_2$: 0.55% by weight
$Er_2O_3$: 0.05% by weight
(Formulation of White Opaque Layer)
$SiO_2$: 54.2% by weight
$P_2O_5$: 4.8% by weight
CaO: 4.6% by weight
$Al_2O_3$: 7.8% by weight
$B_2O_3$: 9.6% by weight
$Na_2O$: 10.5% by weight
$K_2O$: 2.0% by weight
ZnO: 3.8% by weight
$Li_2O$: 2.0% by weight
$CeO_2$: 0.65% by weight
$Er_2O_3$: 0.05% by weight Comparative Example 1

In Comparative Example 1, a white glass container was produced by a one-press method in the same manner as in Example 1, except that as one of formulation A, a glass raw material was prepared so as to obtain the following glass formulation (indicated as Formulation 4 in Table 1), and further investigations were conducted on the effect of the blending amounts of $SiO_2$, $P_2O_5$ and the like, and the white glass container was evaluated.

Furthermore, regarding the cooling air for mold, for the single cooling air stream, that is, the first cooling air stream for cooling the glass container itself, as well as the second cooling air stream for cooling the outer surface of the mold, cooling air at a temperature of 40° C., which was non-wet air, was used, and the jet velocity was set to 10 liters/second for the respective cooling air streams.

As a result, a white multilayer structure formed to include a white transparent layer of relatively low white coloration and a white opaque layer of relatively high white coloration, which was derived from a phase separation phenomenon of a composition for glass, was slightly formed in the body portion. However, the white multilayer structure was not definitely formed in the neck portion, insufficient white coloration was observed, and a large amount of foreign materials having an average particle size of 3 μm or more, which were speculated to be phosphate crystals, was generated.

Just to be sure, the proportions of formulation of $P_2O_5$, CaO and the like in the white transparent layer formed at the surface of the body portion and in the white opaque layer were analyzed using wavelength dispersive fluorescent X-ray spectrometry in the EZ scan mode. However, it was confirmed that the contents of $P_2O_5$ and CaO in the white transparent layer were almost equal to the contents of $P_2O_5$ and CaO in the white opaque layer, respectively.

In addition, a single assumed formulation calculated from the formulation of raw materials used when the white glass container was produced, is also described together.

(Assumed Formulation)
$SiO_2$: 61.1% by weight
$P_2O_5$: 4.8% by weight
CaO: 4.8% by weight
$Al_2O_3$: 6.5% by weight
$B_2O_3$: 6.9% by weight
$Na_2O$: 9.0% by weight
$K_2O$: 2.3% by weight
ZnO: 4.6% by weight
(White Transparent Layer)
$SiO_2$: 61.2% by weight
$P_2O_5$: 4.8% by weight
CaO: 4.8% by weight
$Al_2O_3$: 6.5% by weight
$B_2O_3$: 6.8% by weight
$Na_2O$: 9.0% by weight
$K_2O$: 2.3% by weight
ZnO: 4.6% by weight
(White Opaque Layer)
$SiO_2$: 61.1% by weight
$P_2O_5$: 4.7% by weight
CaO: 4.7% by weight
$Al_2O_3$: 6.5% by weight
$B_2O_3$: 7.0% by weight
$Na_2O$: 9.1% by weight
$K_2O$: 2.3% by weight
ZnO: 4.6% by weight

TABLE 1

| Formulation | Example 1 1 | Example 2 2 | Example 3 3 | Comparative Example 1 4 |
|---|---|---|---|---|
| Evaluation 1 | ⊙ | ○ | ⊙ | Δ |
| Evaluation 2 | ○ | ○ | ○ | X |
| Evaluation 3 | ⊙ | ⊙ | ⊙ | Δ |
| Evaluation 4 | ○ | ○ | ⊙ | X |
| Evaluation 5 | ⊙ | ⊙ | ⊙ | X |
| Evaluation 6 | ○ | ⊙ | ⊙ | X |
| Evaluation 7 | ○ | ⊙ | ⊙ | X |

Examples 4 to 6

In Examples 4 to 6, white glass containers each having a cylindrical neck portion and a cylindrical body portion as illustrated in FIGS. 2(a) and 2(b) were respectively produced by a blow method (blow/blow method) using the glass compositions disclosed in Examples 1 to 3 as one of formulation A (formulations 1 to 3). Similar evaluations were performed according to Example 1 described above.

Meanwhile, regarding the cooling air for mold, wet cooling air, that is, air having a temperature of 40° C. and a water vapor content of 80 g/m³ was used, and the jet velocity was set to 10 liters/second.

Comparative Example 2

In Comparative Example 2, a white glass container was produced in the same manner as in Example 4, except that the white glass container was produced by a blow method (blow and blow method) using the glass composition disclosed in Comparative Example 1 (formulation 4), and evaluations were performed similarly.

Meanwhile, regarding the cooling air for mold, dry cooling air, that is, air having a temperature of 40° C. and a water vapor content of 0 g/m³ was used, and the jet velocity was set to 10 liters/second.

TABLE 2

| Formulation | Example 4 1 | Example 5 2 | Example 6 3 | Comparative Example 2 4 |
|---|---|---|---|---|
| Evaluation 1 | ⊙ | ⊙ | ⊙ | Δ |
| Evaluation 2 | ○ | ○ | ○ | X |
| Evaluation 3 | ⊙ | ⊙ | ⊙ | Δ |
| Evaluation 4 | ○ | ○ | ⊙ | X |
| Evaluation 5 | ⊙ | ⊙ | ⊙ | X |
| Evaluation 6 | ○ | ⊙ | ⊙ | X |
| Evaluation 7 | ○ | ⊙ | ⊙ | X |

Example 7

In Example 7, as one of formulation A, substitutability of $Na_2O$ for $K_2O$ were investigated based on Example 1.

That is, a white glass container was similarly produced by a one-press method, except that the blending amount of $K_2O$ used in Example 1 was changed to 0% by weight, and also, the blending amount of $Na_2O$ was increased by that amount (indicated as Formulation 5 in Table 3). The degree of phase separation and the like were evaluated.

According to the results, the results for Evaluation 1 to Evaluation 7 in Example 7 were perfectly the same as the results obtained in Example 1.

Also, the proportions of formulation in the white transparent layer formed at the surface of the body portion and the same proportions in the white opaque layer in the white glass container thus obtained were as follows.

(White Transparent Layer)
$SiO_2$: 62.0% by weight
$P_2O_5$: 2.2% by weight
CaO: 2.5% by weight
$Al_2O_3$: 10.5% by weight
$B_2O_3$: 6.5% by weight
$Na_2O$: 12.6% by weight
ZnO: 3.7% by weight
(White Opaque Layer)
$SiO_2$: 56.8% by weight $P_2O_5$: 6.3% by weight
CaO: 4.6% by weight
$Al_2O_3$: 6.8% by weight
$B_2O_3$: 8.8% by weight
$Na_2O$: 12.9% by weight
ZnO: 3.8% by weight That is, it was confirmed that even in a case in which $K_2O$ was completely replaced with $Na_2O$, the contents of $P_2O_5$ and CaO in the white transparent layer were smaller than the contents of $P_2O_5$ and CaO in the white opaque layer, respectively.

Example 8

In Example 8, as one of formulation B, substitutability of MgO for ZnO as well as substitutability $Na_2O$ for $K_2O$ were investigated together based on Example 1.

That is, a white glass container was similarly produced by a one-press method, except that the blending amounts of $K_2O$ and ZnO used in Example 1 were respectively changed to 0% by weight, and also, the respective decrements were substituted with the blending amounts of $Na_2O$ and MgO (indicated as Formulation 6 in Table 3). The degree of phase separation and the like were evaluated.

According to the results, the results for Evaluation 1 to Evaluation 7 in Example 8 were almost the same as the results obtained in Example 1.

Also, the proportions of formulation in the white transparent layer formed at the surface of the body portion and the same proportions in the white opaque layer in the white glass container thus obtained were as follows.

(White Transparent Layer)
$SiO_2$: 62.0% by weight
$P_2O_5$: 2.2% by weight
CaO: 2.5% by weight
$Al_2O_3$: 10.5% by weight
$B_2O_3$: 6.5% by weight
$Na_2O$: 12.6% by weight
MgO: 3.7% by weight
(White Opaque Layer)
$SiO_2$: 56.8% by weight
$P_2O_5$: 6.3% by weight
CaO: 4.6% by weight
$Al_2O_3$: 6.8% by weight
$B_2O_3$: 8.8% by weight
$Na_2O$: 12.9% by weight
MgO: 3.8% by weight That is, it was confirmed that even in a case in which $K_2O$ was completely replaced with $Na_2O$, and ZnO was completely replaced with MgO, the contents of $P_2O_5$ and CaO in the white transparent layer were smaller than the contents of $P_2O_5$ and CaO in the white opaque layer, respectively.

Example 9

In Example 9, as formulation B, substitutability of MgO for ZnO as well as substitutability of $Na_2O$ for $K_2O$, and the influence of the blending ratio of $B_2O_3$ and the ratio of CaO/MgO were investigated together based on Example 1.

That is, the blending amounts of $K_2O$ and ZnO used in Example 1 were respectively changed to 0% by weight, and also, the respective decrements were substituted by increasing the blending amounts of $Na_2O$ and MgO. Also, the blending ratio at the time of feeding $B_2O_3$ was set to 1.5% by weight.

Furthermore, the blending ratio at the time of feeding CaO was set to 5% by weight, and the ratio of CaO/MgO was set to 1.4. A white glass container was similarly produced by a one-press method, except that changes were made as described above (indicated as Formulation 7 in Table 3). The degree of phase separation and the like were evaluated.

According to the results, the results for Evaluation 1 to Evaluation 7 in Example 9 were almost the same as the results obtained in Example 1.

Also, the proportions of formulation in the white transparent layer formed at the surface of the body portion and the same proportions in the white opaque layer in the white glass container thus obtained were as follows.

Furthermore, the proportions of formulation in the white transparent layer formed at the surface of the body portion and the same proportions in the white opaque layer in the white glass container thus obtained were as follows.

(White Transparent Layer)
$SiO_2$: 63.8% by weight
$P_2O_5$: 2.8% by weight
CaO: 2.9% by weight
$Al_2O_3$: 9.0% by weight
$B_2O_3$: 1.5% by weight
$Na_2O$: 17.9% by weight
MgO: 2.1% by weight
(White Opaque Layer)
$SiO_2$: 58.9% by weight
$P_2O_5$: 6.4% by weight
CaO: 5.1% by weight
$Al_2O_3$: 7.9% by weight
$B_2O_3$: 1.4% by weight
$Na_2O$: 16.6% by weight
MgO: 3.7% by weight That is, also in Example 9, it was confirmed that the contents of $P_2O_5$ and CaO in the white transparent layer were smaller than the contents of $P_2O_5$ and CaO in the white opaque layer, respectively.

Example 10

In Example 10, as formulation B, substitutability of MgO for ZnO as well as substitutability of $Na_2O$ for $K_2O$, and the influence of the blending ratio of $B_2O_3$ and the ratio of CaO/MgO were investigated together based on Example 1.

That is, the blending amounts of $K_2O$ and ZnO used in Example 1 were respectively changed to 0% by weight, and also, the respective decrements were substituted by increasing the blending amounts of $Na_2O$ and MgO. Also, the blending ratio at the time of feeding $B_2O_3$ was set to 1.5% by weight.

Furthermore, the blending ratio at the time of feeding CaO was set to 5.4% by weight, and the ratio of CaO/MgO was set to 1.8. A white glass container was similarly produced by a one-press method, except that changes were made as described above (indicated as Formulation 8 in Table 3). The degree of phase separation and the like were evaluated.

According to the results, the results for Evaluation 1 to Evaluation 7 in Example 10 were almost the same as the results obtained in Example 1.

Also, the proportions of formulation in the white transparent layer formed at the surface of the body portion and the same proportions in the white opaque layer in the white glass container thus obtained were as follows.

(White Transparent Layer)
$SiO_2$: 63.6% by weight
$P_2O_5$: 2.9% by weight
CaO: 2.4% by weight
$Al_2O_3$: 8.3% by weight
$B_2O_3$: 1.5% by weight Na$_2$O: 18.3% by weight
MgO: 3.0% by weight
(White Opaque Layer)
SiO$_2$: 58.1% by weight
P$_2$O$_5$: 7.2% by weight
CaO: 5.7% by weight
Al$_2$O$_3$: 8.0% by weight
B$_2$O$_3$: 1.4% by weight
Na$_2$O: 16.5% by weight
MgO: 3.1% by weight That is, also in Example 10, it was confirmed that the contents of P$_2$O$_5$ and CaO in the white transparent layer were smaller than the contents of P$_2$O$_5$ and CaO in the white opaque layer, respectively.

TABLE 3

| Formulation | Example 7 5 | Example 8 6 | Example 9 7 | Example 10 8 |
|---|---|---|---|---|
| Evaluation 1 | ⊙ | ⊙ | ⊙ | ⊙ |
| Evaluation 2 | ○ | ○ | ○ | ○ |
| Evaluation 3 | ⊙ | ⊙ | ⊙ | ⊙ |
| Evaluation 4 | ○ | ○ | ⊙ | ⊙ |
| Evaluation 5 | ⊙ | ⊙ | ⊙ | ⊙ |
| Evaluation 6 | ○ | ⊙ | ⊙ | ⊙ |
| Evaluation 7 | ○ | ⊙ | ⊙ | ⊙ |

INDUSTRIAL APPLICABILITY

Thus, as described above, when the white glass container of the present invention and the method for producing the same are used, a white glass container can be obtained, in which at least the body portion has, in a portion or in the entirety, a white multilayer structure (for example, a two-layer structure or a three-layer structure) formed to include a white transparent layer of relatively low white coloration and a white opaque layer of relatively high white coloration, the white multilayer structure being derived from a phase separation phenomenon of a predetermined composition for glass; and which is imparted with excellent mechanical strength and whiteness, even if the glass composition is halogen-free, by taking the relation between the contents of P$_2$O$_5$ and the like in the white transparent layer and the contents of P$_2$O$_5$ in the white opaque layer into consideration, irrespective of the melting conditions or molding conditions for the glass composition.

Therefore, when the white glass container of the present invention and the method for producing the same are used, a white glass container which has a white color rich in transparency in the body portion as well as the neck portion (bottle neck), and has in overall excellent mechanical strength, can be efficiently obtained. Since the white glass container has an excellent feel of high quality and excellent texture, and does not need further decorative treatments, it is expected that the white glass container may be utilized as glass containers for high-quality cosmetic products, and the like.

Only by measuring the contents of P$_2$O$_5$ and the like at predetermined sites (white transparent layer and white opaque layer) of the white glass container using wavelength dispersive fluorescent X-ray spectrometry, and taking the relation of the contents into consideration, it is confirmed and guaranteed that a white glass container having excellent mechanical strength is obtained.

Therefore, it can be said that the method for producing a white glass container by utilizing wavelength dispersive fluorescent X-ray spectrometry is a production method including a predetermined examination method, which is simple and works with satisfactory accuracy.

Meanwhile, in a case in which a white multilayer structure is formed at the neck portion (bottle neck), there has been a problem that whiteness is enhanced, but mechanical strength and dimensional stability are slightly deteriorated. However, such a problem has been addressed by considering the method for cooling the neck portion (condition of cooling air), or covering the periphery of the neck portion with a metal member.

The invention claimed is:

1. A white glass container comprising at least a neck portion and a body portion and being derived from a phase separation phenomenon of a halogen-free glass composition,
    wherein the glass composition includes, as ingredients, at least 45-65% of SiO$_2$, 2-8% of P$_2$O$_5$, 5-9% of Al$_2$O$_3$, 1-13% of B$_2$O$_3$, 5-12% of R$_2$O, 3-10% of ZnO and 3-12% of CaO based on weight percent on the basis of the total amount, R being at least one selected from Na and K,
    or at least 45-65% of SiO$_2$, 2-8% of P$_2$O$_5$, 5-9% of Al$_2$O$_3$, 1-13% of B$_2$O$_3$, 5-12% of R$_2$O, 3-10% of MgO and 3-12% of CaO based on weight percent on the basis of the total amount, R being at least one selected from Na and K,
    the degree of whiteness in the neck portion as measured according to JIS Z 8730 is adjusted to a value of 40 or more and below 80,
    the degree of whiteness in the body portion as measured according to JIS Z 8730 is adjusted to a value of 80 or more,
    at least a portion of the body portion comprises a white multilayer structure formed to successively include, in a direction from an outer surface side of the body portion toward an inner surface side of the body portion, a white transparent layer of relatively low white coloration and a white opaque layer of relatively high white coloration, and
    the content of P$_2$O$_5$ in the white transparent layer is made smaller than the content of P$_2$O$_5$ in the white opaque layer.

2. The white glass container according to claim 1, wherein the content of CaO in the white transparent layer is made smaller than the content of CaO in the white opaque layer.

3. The white glass container according to claim 1, wherein the average particle size of white crystals in the white opaque layer is adjusted to a value of below 400 nm.

4. The white glass container according to claim 1,
    wherein the neck portion does not have a white opaque layer having a degree of whiteness of 80 or more as measured according to JIS Z 8730, and
    at least a portion of the body portion comprises the white multilayer structure including the white transparent layer having a degree of whiteness of below 80 as measured according to JIS Z 8730 and the white opaque layer having a degree of whiteness of 80 or more as measured according to JIS Z 8730.

5. A method for producing a white glass container having at least a neck portion and a body portion and derived from a phase separation phenomenon of a halogen-free glass composition,
    wherein the glass composition includes, as ingredients, at least 45-65% of SiO$_2$, 2-8% of P$_2$O$_5$, 5-9% of Al$_2$O$_3$, 1-13% of B$_2$O$_3$, 5-12% of R$_2$O, 3-10% of ZnO and 3-12% of CaO based on weight percent on the basis of the total amount, R being at least one selected from Na and K, or at least 45-65% of SiO$_2$, 2-8% of P$_2$O$_5$, 5-9% of $Al_2O_3$, 1-13% of $B_2O_3$, 5-12% of $R_2O$, 3-10% of MgO and 3-12% of CaO based on weight percent on the basis of the total amount, R being at least one selected from Na and K, the degree of whiteness in the neck portion as measured according to JIS Z 8730 is adjusted to a value of 40 or more and below 80, the degree of whiteness in the body portion as measured according to JIS Z 8730 is adjusted to a value of 80 or more, at least a portion of the neck portion and at least a portion of the body portion comprise a white multilayer structure configured to successively include, in a direction from outer surface sides of the neck portion and the body portion toward inner surface sides of the neck portion and the body portion, a white transparent layer of relatively low white coloration and a white opaque layer of relatively high white coloration, the content of $P_2O_5$ in the white transparent layer is smaller than the content of $P_2O_5$ in the white opaque layer, and the method comprises the following Step 1 and Step 2:

Step 1: a step of preparing a composition for glass having, as ingredients, at least $SiO_2$, $P_2O_5$, $Al_2O_3$, $B_2O_3$, $R_2O$, ZnO and CaO, R being at least one selected from Na and K, or at least $SiO_2$, $P_2O_5$, $Al_2O_3$, $B_2O_3$, $R_2O$, MgO and CaO, R being at least one selected from Na and K, and melting the composition for glass; and Step 2: a step of molding the molten composition for glass by a one-press method using a mold and a plunger, and also slowly cooling the composition for glass, so as to obtain a white glass container comprising, in a least a portion of the neck portion and in at least a portion of the body portion, a three-layer structure derived from a phase separation phenomenon of the glass composition.

6. A method for producing a white glass container having at least a neck portion and a body portion and derived from a phase separation phenomenon of a halogen-free glass composition, wherein the glass composition includes, as ingredients, at least 45-65% of $SiO_2$, 2-8% of $P_2O_5$, 5-9% of $Al_2O_3$, 1-13% of $B_2O_3$, 5-12% of $R_2O$, 3-10% of ZnO and 3-12% of CaO based on weight percent on the basis of the total amount, R being at least one selected from Na and K, or at least 45-65% of $SiO_2$, 2-8% of $P_2O_5$, 5-9% of $Al_2O_3$, 1-13% of $B_2O_3$, 5-12% of $R_2O$, 3-10% of MgO and 3-12% of CaO based on weight percent on the basis of the total amount, R being at least one selected from Na and K, the degree of whiteness in the neck portion as measured according to JIS Z 8730 is adjusted to a value of 40 or more and below 80, the degree of whiteness in the body portion as measured according to JIS Z 8730 is adjusted to a value of 80 or more, at least a portion of the neck portion and at least a portion of the body portion comprise a white multilayer structure configured to successively include, in a direction from outer surface sides of the neck portion and the body portion toward inner surface sides of the neck portion and the body portion, a white transparent layer of relatively low white coloration and a white opaque layer of relatively high white coloration, the content of $P_2O_5$ in the white transparent layer is smaller than the content of $P_2O_5$ in the white opaque layer, and the method comprises the following Step 1' and Step 2':

Step 1': a step of preparing a composition for glass having, as ingredients, at least $SiO_2$, $P_2O_5$, $Al_2O_3$, $B_2O_3$, $R_2O$, ZnO and CaO, R being at least one selected from Na and K, or at least $SiO_2$, $P_2O_5$, $Al_2O_3$, $B_2O_3$, $R_2O$, MgO and CaO, R being at least one selected from Na and K, and melting the composition for glass; and Step 2': a step of molding the molten composition for glass by a blow method using a mold and cooling air, and also slowly cooling the composition for glass, so as to obtain a white glass container comprising, in a least a portion of the neck portion and in at least a portion of the body portion, a two-layer structure derived from a phase separation phenomenon of the glass composition.

* * * * *